(12) United States Patent
Kochi et al.

(10) Patent No.: US 7,489,335 B2
(45) Date of Patent: Feb. 10, 2009

(54) PHOTOGRAPHIC APPARATUS WITH FUNCTION OF IMAGE CORRECTION AND METHOD THEREOF

(75) Inventors: Nobuo Kochi, Tokyo (JP); Tadayuki Ito, Tokyo (JP); Takayuki Noma, Tokyo (JP)

(73) Assignee: Topcon Corporation, Tokyo (JP)

( * ) Notice: Subject to any disclaimer, the term of this patent is extended or adjusted under 35 U.S.C. 154(b) by 539 days.

(21) Appl. No.: 10/917,519

(22) Filed: Aug. 13, 2004

(65) Prior Publication Data

US 2005/0122400 A1 Jun. 9, 2005

(30) Foreign Application Priority Data

Aug. 13, 2003 (JP) ............................. 2003-293201
Aug. 27, 2003 (JP) ............................. 2003-303685

(51) Int. Cl.
*H04N 17/00* (2006.01)
*H04N 5/217* (2006.01)

(52) U.S. Cl. ........................................ 348/180; 348/241

(58) Field of Classification Search ................. 348/360, 348/361, 241, 240.99, 240.3, 180, 187
See application file for complete search history.

(56) References Cited

U.S. PATENT DOCUMENTS 6,097,430 A * 8/2000 Komiya et al. ............ 348/218.1

2002/0101531 A1* 8/2002 Kaneda ..................... 348/347
2004/0066454 A1* 4/2004 Otani et al. ................. 348/188

FOREIGN PATENT DOCUMENTS

| JP | 9-329418 A | 12/1997 |
|---|---|---|
| JP | 2000-069343 A | 3/2000 |
| JP | 2003-050990 A | 2/2003 |
| JP | 2003-242485 A | 8/2003 |

* cited by examiner

*Primary Examiner*—Lin Ye
*Assistant Examiner*—Hung H Lam
(74) *Attorney, Agent, or Firm*—Foley & Lardner LLP

(57) ABSTRACT

A photographic apparatus with an image correction function is provided, in which even if an image has a large distortion at its peripheral area, the lens distortion is suitably corrected and the image distortion is small in spite of an image having a wide field of view. The apparatus comprises a photographic lens section 10 able to adjust photographic parameters, a photographic parameter detecting section 20 for detecting the photographic parameters of the photographic lens section 10 during photographing, a photoreceptor section 30 for receiving the image information formed by the photographic lens section 10, and an image correction section 50 for receiving an image signal from the photoreceptor section 30, and for performing distortion correction of the information signal based on a predetermined calibration parameter corresponding to the photographic parameter detected at the photographic parameter detecting section 20.

21 Claims, 25 Drawing Sheets

75: zooming area

CALIBRATION IMAGE AT A PRIOR FOCAL LENGTH

CALIBRATION IMAGE AT A PRESENT FOCAL LENGTH

FOCAL LENGTH INFORMATION

SIMPLE FORMING OF PANORAMIC IMAGE
WITH THE USE OF CORRECTED IMAGES

PHOTOGRAPHIC APPARATUS WITH FUNCTION OF IMAGE CORRECTION AND METHOD THEREOF

BACKGROUND OF THE INVENTION

1. Technical Field

This invention relates to a photographic apparatus and a method suitable for use in a digital camera for taking still images or a video camera for moving images and, particularly relates to a photographic apparatus having a function to output a lens distortion corrected image taken with a CCD (charge-coupled device) camera, a monitoring camera or the like and relates to a method thereof.

2. Related Arts

Conventionally, images photographed with a digital camera for taking still images or a video camera for taking moving images have been generally printed on sensitive papers or displayed on monitoring screens as they are, particularly, without correction of image distortion due to a fish-eye lens or wide-angle lens, for example. The fish-eye lens and wide-angle lens are suitable to the field in which the width of a field of view is given preference over the image distortion, such as a monitoring camera. To take a landscape or scene, a plurality of photos arranged side-by-side to form so-called a panoramic photo have been taken. Also, there has been a camera to make an image suitable to an object by adjusting the focal length of the camera with the use of its zoom function to adjust the field of view of one image.

On the other hand, if it is intended to take a photographed image without image distortion due to a lens distortion then a camera having a high-precision lens, for example a camera for aerial photogrammetry, is available. However, such a camera having a high-precision lens is expensive. It is therefore a problem that such a camera is difficult to be used in the application for which an equipment budget is limited. It is also proposed to correct the image distortion due to the lens distortion. However, it is another problem that perfect correction of the image distortion is difficult in case of complex variation of the image distortion such as in a zoom lens or fish-eye lens.

When a wide-angle lens or a fish-eye lens is used in a monitoring camera, the image distortion increases, particularly at the peripheral area of the image. If a clear image is required to identify, for example fire causes of buildings or thieves and robberies, it is yet another problem that examination from the image without correction of its distortion is difficult to perform. For the panoramic photos, the distortion occurred at its peripheral area is also a problem when adjoining photos are jointed together. Further, a camera with a zoom function has a problem that the image distortion is larger than that of a fixed focus length camera because the lens distortion is changed in response to the adjusted focal length.

This invention solves the problems described above and the object of the invention is to provide a photographic apparatus with an image correction function and a method thereof, in which even an image obtained with for example a wide-angle lens or an eye-fish lens has a large distortion at its peripheral area, the lens distortion is suitably corrected and the image distortion is small in spite of the image having a wide field of view. It is also another object of the invention to provide a photographic apparatus with an image correction function and a method thereof, in which the lens distortion is suitably corrected and the image distortion is small at the junction of the adjoining images when the adjoining images are jointed to form an image having a wide field of view, such as a panoramic photo. It is yet another object of the invention to provide a photographic apparatus with an image correction function and a method thereof, in which an image is always suitably corrected even in a moving picture camera with a zoom function.

SUMMARY OF THE INVENTION

An photographic apparatus according to the present invention that can achieve the objects described above, comprises, as shown in FIG. 1 for example: a photographic lens section 10 with adjustable photographic parameter; a photographic parameter detecting section 20 for detecting the photographic parameter of the photographic lens section 10 during photographing; a photoreceptor section 30 for receiving image information formed by the photographic lens section 10; and an image correction section 50 for receiving an image signal from the photoreceptor section 30, and for performing distortion correction of the information signal based on a specific or predetermined calibration parameter corresponding to the photographic parameter detected at the photographic parameter detecting section 20.

In the photographic apparatus with a function of image correction that is configured in such a way above, the photographic lens section 10 can adjust photographic parameters including for example a focal length, a time period of strobe flashing, an object distance, an aperture and the like. The photographic parameter detecting section 20 detects the photographic parameters of the photographic lens section 10 during photographing the object. The photoreceptor section 30 receives the image information made by the photographic lens section 10. The image correction section 50 receives the image signal from the photoreceptor section 30 and performs distortion correction of the image signal based on a predetermined calibration parameter corresponding to the photographic parameter detected at the photographic parameters detecting section 20. Consequently, even if there exists a large distortion of image at the peripheral area of the image photographed with the photographic lens section 10, the image correction section 50 performs distortion correction of the image signal, resulting in an easy-to-see image.

The photographic apparatus with a function of image correction according to the invention preferably further comprises a calibration parameter storing section 60 for storing predetermined calibration parameter corresponding to the photographic parameter; and the image correction section 50 is preferably configured to extract, from the calibration parameters stored in the calibration parameter storing section 60, the calibration parameter corresponding to the photographic parameter detected at the photographic parameter detecting section 20. The use of the calibration parameter storing section 60 permits to obtain a predetermined calibration parameters corresponding to the photographic parameters for the photographic lens section 10 and to utilize existing calibration parameters without obtaining calibration parameters every time.

In the photographic apparatus with a function of image correction according to the invention, the photographic lens section 10 may have: a zoom function section 11 functioning as a part thereof moves; and a focal length data outputting section 12 for outputting the focal length data of the photographic lens section 10 which change in response to the zooming of the zoom function section 11, and that the calibration parameter storing section 60 stores calibration data corresponding to the focal length, as the calibration parameter, of the photographic lens section 10, and that the image correction section 50 is adapted to perform distortion correction to the image signal based on the calibration data. The photographic lens section 10 provided with the zoom function section 11 is able to regulate its focal length so as to obtain a field of view adapted to photograph an object. Since the focal length data outputting section 12 outputs the focal length data of the photographic lens section 10 which vary in response to the zoom movement of the zoom function section 11, the image correction section 50 can perform correction of the image signal distortion based on the calibration data corresponding to the focal length data from the calibration parameter storing section 60.

The photographic apparatus with a function of image correction according to the invention, is preferably configured such that as shown in FIG. 3, for example, the photographic lens section 10 includes a lens having changeable inclination of an optical axis thereof or changeable position thereof; the photographic parameter detecting section 20 detects the position of the lens and the inclination of the optical axis of the photographic lens section 10 as the photographic parameter; and the image correction section 50 performs distortion correction of the image signal based on the predetermined calibration parameter corresponding to the lens position or optical axis inclination of the photographic lens section 10. According to the configuration in such a way as described above, an object having a size larger than that of one image can be photographed with a plurality of images by changing the lens position or optical axis inclination of the photographic lens section 10. The object can be expressed by combining a plurality of images, since the image correction section 50 performs distortion correction of the image signal based on the predetermined calibration parameters corresponding to the lens position or optical axis inclination of the photographic lens section 10 which is detected with the photographic parameter detecting section 20.

The photographic apparatus with a function of image correction according to the invention, is preferably configured such that as shown in FIG. 5, for example, the photographic lens section 10 includes a plurality of photographic lens sections (10A, 10B, 10C) having overlapping photographic areas; the photographic parameter detecting section 20 detects, as the photographic parameter, the installation positions and directions of the optical axes of the plural number of the photographic lens sections; and the image correction section 50 performs distortion correction of the image signal based on the predetermined calibration parameters corresponding to the lens positions or optical axis inclinations of the plural number of photographic lens sections. According to the configuration in such a way as described above, an object having a size larger than that of one image can be photographed with the use of a plurality of images photographed with the photographic lens section 10 which includes a plurality of photographic lens sections having overlapping photographic areas. The object can be expressed by combining a plurality of images, since the image correction section 50 is adapted to perform distortion correction of the image signal based on the predetermined calibration parameters corresponding to the lens positions or optical axis inclinations of the plural number of photographic lens sections which were detected with the photographic parameter detecting section 20.

The photographic apparatus with a function of image correction according to the invention, is preferably configured such that as shown in FIGS. 1, 3 and 5, for example, the image correction section 50 includes a panoramic image forming section 52 for correlating the data of a plurality of images having overlapped areas which were photographed by the photographic lens section 10 to form a panoramic image. According to the configuration in such a way as described above, since the panoramic image forming section 52 performs distortion correction of a plurality of images or the image signals of a plurality of photographic lens sections, the image distortion at peripheral area of each image is corrected and the adjoining images can be therefore easily jointed. Accordingly, the object can be expressed in a panoramic image by combining a plurality of images or images from a plurality of photographic lens sections.

The photographic apparatus with a function of image correction according to the invention, is preferably configured such that as shown in FIGS. 1, 3 and 5 for example, the photoreceptor section 30 forms a digital image signal; the photographic apparatus further comprises a digital image storing section 40 for storing the digital image signal sent from the photoreceptor section 30 as well as storing the photographic parameter; and the digital image storing section 40 stores the digital image signal as a predetermined format. According to the configuration in such a way as described above, more precise correction of image distortion by an external image processing apparatus is allowed, since the digital image information storing section 40 stores the digital image signal and the photographic parameters.

An inventive photographic apparatus that can achieve the objects described, comprises: as shown in FIG. 7 for example, a photographic lens section 110 with an adjustable photographic parameter; a photographic parameter detecting section 120 for detecting the photographic parameter of the photographic lens section 110 during photographing; a photoreceptor section 130 for receiving image information formed by the photographic lens section 110; a photographed image data forming section 140 for combining image data outputted from the photoreceptor section 130 with the photographic parameter detected by the photographic parameter detecting section 120 during the image data being obtained by photographing, to form photographed image data; and a photographed image data outputting section 150 for outputting the photographed image data formed by the photographed image data forming section 140, and the photographed image data outputted from the photographed image data outputting section 150 is used to correct the photographed image data with the use of the photographic parameter of the photographed image data.

According to the configuration in such a way as described above, the photographic lens section 110 can regulate photographic parameters. The photographic parameter detecting section 120 detects the photographic parameters of the photographic lens section 110 during photographing the object. The photoreceptor section 130 receives the image information made by the photographic lens section 110. The photographed image data forming section 140 combines the image data outputted from the photoreceptor section 130 with the photographic parameters detected by the photographic parameter detecting section 120 when the image data were obtained by photographing, to form photographed image data, which is in turn outputted from the photographed image data outputting section 150. Then an external image processing apparatus 200 can perform correction of the photographed image data with the use of the photographic parameters of the photographed image data outputted from the photographed image data outputting section 150. Accordingly, the distortion of an image signal can be corrected by for example the external image processing apparatus 200, even if the image which was photographed with the photographic lens section 110 has a large distortion at its peripheral area.

In the photographic apparatus according to the invention, the photographed image data outputted from the photographed image data outputting section 150 are preferably processed by a panoramic image forming section 220 which correlates the data of a plurality of images having overlapped areas which were photographed by the photographic lens section 110 to form a panoramic image. According to the configuration in such a way as described above, since the panoramic image forming section 220 performs distortion correction of a plurality of image data having overlapped areas based on the predetermined calibration parameters, the image distortion at peripheral area of each image is corrected and the adjoining images can be therefore easily jointed. Accordingly, the object can be expressed in a panoramic image by combining a plurality of image data having overlapped areas.

In the photographic apparatus according to the invention, preferably, the photographic lens section 110 is a lens portion of a digital camera; and the panoramic image forming section is enabled when the digital camera is in its panorama mode. According to the configuration in such a way as described above, in operation of the distortion correction of the image signal by the external image processing apparatus, the process for expression of an object in a panoramic image is smoothly proceeded since the panoramic image forming section 220 is enabled when the digital camera is in its panorama mode.

An photographing method according to the present invention that can achieve the objects described, comprises: as shown in FIG. 2 for example, detecting a photographic parameter of a photographic lens section 10 during photographing with the photographic lens section 10 with an adjustable photographic parameter (S108); receiving, at a photoreceptor section 30, image information formed by the photographic lens section 10 (S104); receiving an image signal from the photoreceptor section 30; and performing distortion correction of the image signal based on a predetermined calibration parameter corresponding to the photographic parameter detected with the photographic parameter detecting section 20 (S112).

An inventive photographing method that can achieve the objects described, comprises the steps of as shown in FIG. 4 for example, photographing an object, using a photographic lens section with adjustable position or adjustable inclination of optical axis of a lens constituting the photographic lens section, under a condition of a predetermined lens position or a predetermined inclination of the optical axis of the lens (S204); detecting the position of the lens or the inclination of the optical axis of the lens during photographing with the photographic lens section 10 (S210); receiving, at a photoreceptor section, the image information formed by the photographic lens section 10 (S208); receiving an image signal from the photoreceptor section 30; performing distortion correction of the image signal based on predetermined calibration parameter corresponding to the detected position or the detected inclination of the optical axis of the lens (S214); and correlating the data of a plurality of images having overlapped areas photographed by the photographic lens section to form a panoramic image by a panoramic image forming section 52 (S218).

An inventive photographing method that can achieve the objects described, comprises the steps of: as shown in FIG. 6 for example, photographing an object under a condition of a predetermined direction of an optical axis, using a plurality of photographic lens sections (10A, 10B, 10C) located so that an image taken by each photographic lens section has an overlapped areas (S304); detecting a direction of the optical axis the photographic lens section during photographing with the photographic lens section 10 (S310); receiving, at a photoreceptor section 30, the image information formed by the photographic lens section (S308); receiving an image signal from the photoreceptor section 30; performing distortion correction of the image signal based on a predetermined calibration parameter corresponding to the detected direction of the optical axis 10 (S314); and correlating data of a plurality of images having overlapped areas photographed by the photographic lens sections to form a panoramic image by a panoramic image forming section 52 (S316).

An inventive photographing method that can achieve the objects described, comprises: as shown in FIG. 8 for example, detecting a photographic parameter of a photographic lens section 110 during photographing with the photographic lens section 110 with adjustable photographic parameter (S408); receiving, at a photoreceptor section 130, image information formed by the photographic lens section 110 (S404); combining image data outputted from the photoreceptor section 130 with the photographic parameter detected the photographic parameter detecting section 120 during the image data being obtained by photographing, to form photographed image data (S412); and outputting the photographed image data formed in the photographed image data forming step (S414), the photographed image data outputted in the photographed image data outputting step being used for a correction of the photographed image data with the use of the photographic parameter of the photographed image data (S416).

According to the photographic apparatus with a function of image correction of the invention, even if there exists a large distortion of an image at the peripheral area of the image photographed with the photographic lens section 10, the image correction section 50 performs distortion correction of the image signal, resulting in an easy-to-see image. According to the photographic apparatus with a function of image correction of the invention, the lens distortion is suitably corrected and the image distortion is small at the junction of the adjoining images when the adjoining images are jointed to form an image having its wide field of view, such as a panoramic photo.

This application is based on the Patent Applications No. 2003-293201 filed on Aug. 13, 2003 and 2003-303685 filed on Aug. 27, 2003 in Japan, the contents of which are hereby incorporated in its entirety by reference into the present application, as part thereof.

The present invention will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

The use of the terms "a" and "an" and "the" and similar referents in the context of describing the invention (especially in the context of the following claims) are to be construed to cover both the singular and the plural, unless otherwise indicated herein or clearly contradicted by context. The use of any and all examples, or exemplary language (e.g., "such as") provided herein, is intended merely to better illuminate the invention and does not pose a limitation on the scope of the invention unless otherwise claimed.

DETAILED DESCRIPTION OF THE PREFERRED EMBODIMENT

The invention is hereinafter described with reference to the accompanying drawings. The invention is exemplified by the following Example 1 to Example 4 and the items common to those examples are described in "Calibration of a zoom lens," "Description of a calibration apparatus," and "Successive orientation."

EXAMPLE 1

Figure 1:
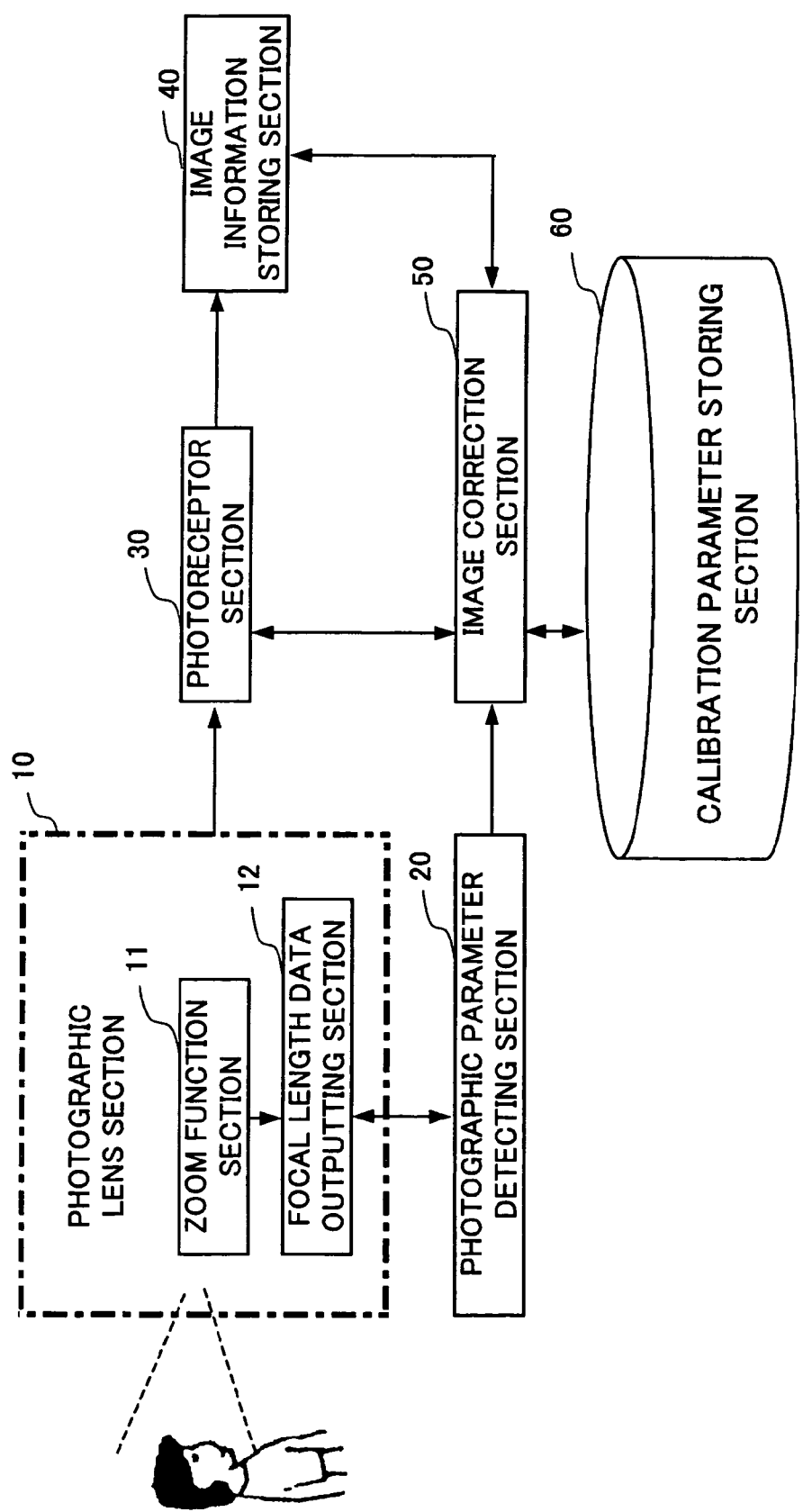
FIG. 1 is an overall block diagram, illustrating a first embodiment of the invention.

FIG. 1 is an overall block diagram, illustrating a first embodiment of the invention. The first embodiment is configured such that an image whose lens distortion was corrected is outputted by a photographic apparatus itself. In the figure, the photographic apparatus with a function of image correction according to the invention includes a photographic lens section 10, a photographic parameter detecting section 20, a photoreceptor section 30, a digital image information storing section 40, an image correction section 50, and a calibration parameter storing section 60.

The photographic lens section 10 can adjust photographic parameters. The photographic parameter includes for example a focal length, a duration of strobe flashing, an depth of focus, an aperture and the like. The photographic lens section 10 has a zoom function section 11 for regulating the focal length by for example the movement of part of the lens constituting the photographic lens section 10, to widen or narrow the field of view of the lens, and a focal length data outputting section 12 for outputting the focal length data of the photographic lens section 10 which vary in response to the zooming movement of the zoom function section 11.

The photographic parameter detecting section 20 detects the photographic parameters of the photographic lens section 10 during photographing the object. For example, the focal length data of the photographic lens section 10 outputted from the focal length data outputting section 12 is used to detect the focal length, as one of photographic parameters. The photoreceptor section 30 receives the image information made by the photographic lens section 10. For example, a CCD element is used as the photoreceptor section 30.

The digital image information storing section 40 stores the photographic parameters together with the digital image signal sent from the photoreceptor section 30. The digital image information storing section 40 may be configured to store a digital image signal, using an image format for digital cameras, for example "exif" the specification of which is established by JEIDA (Japan Electronic Industry Development Association). The "exif" includes photographic parameters, such as an exposure time, F value, an exposure program, a shutter speed, aperture, brightness and object distance as well as image information such as a width and height of an image (pixel).

The image correction section 50 receives the image signal from the photoreceptor section 30 and performs distortion correction of the image signal based on a predetermined calibration parameter corresponding to the photographic parameter detected at the photographic parameter detecting section 20. The predetermined calibration parameter is extracted from the calibration parameters stored in the calibration parameter storing section 60, for example by the image correction section 50, as a calibration parameter corresponding to the photographic parameter detected at the photographic parameter detecting section 20. The calibration parameters include, a principal position, focal length, lens distortion parameter and others, for example.

The calibration parameter storing section 60 stores predetermined calibration parameters corresponding to the photographic parameters. For example, if the photographic lens section 10 with a zoom function is used then it is calibrated on each focal length to obtain calibration parameter therefore in advance. Such calibration for the photographic lens section 10 with a zoom function is described later in detail.

Figure 2:
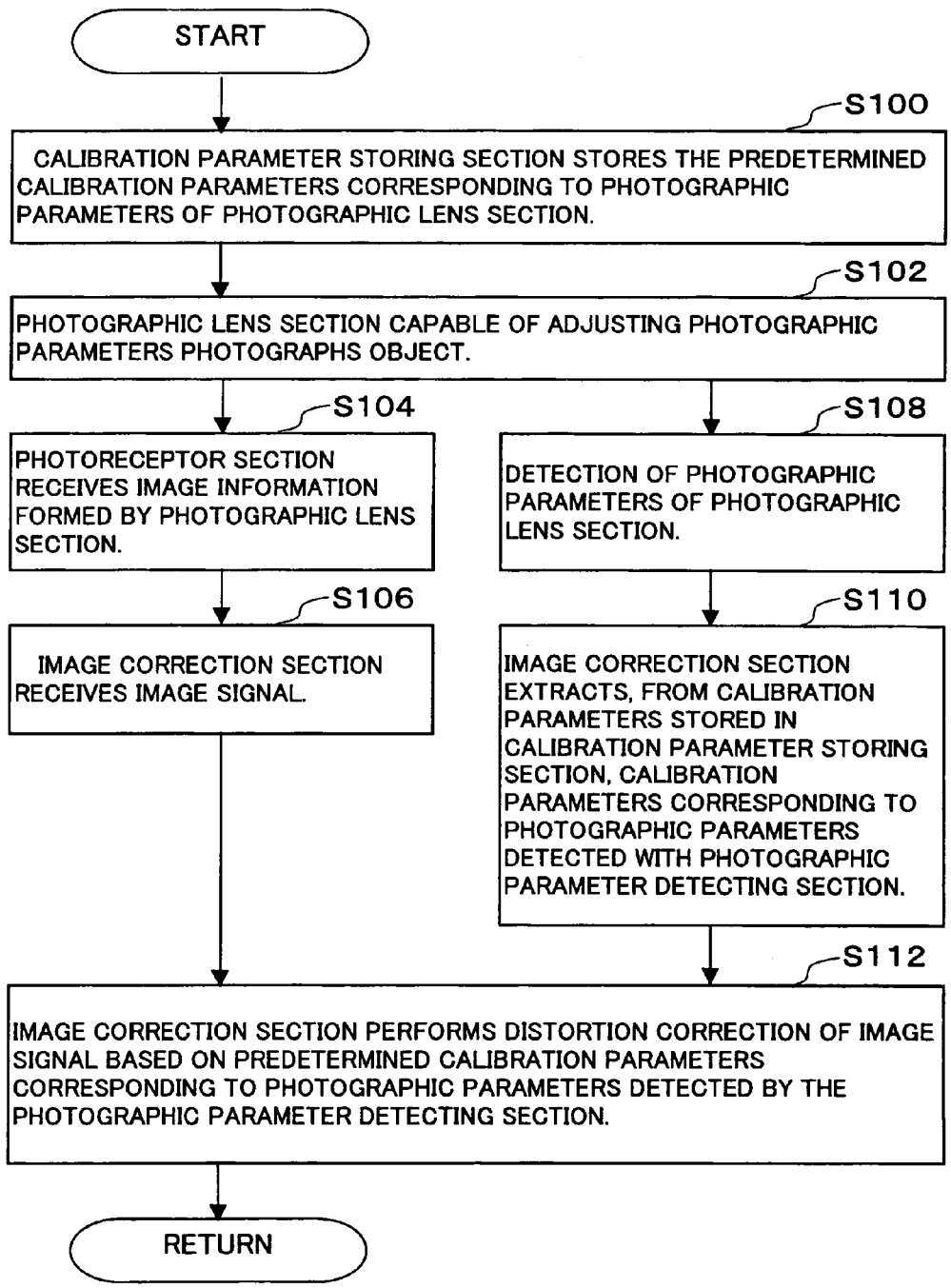
FIG. 2 is a flow chart, illustrating the first embodiment.

Next, referring to the flow chart in FIG. 2, operation of the apparatus of the first embodiment configured in such a way above is described. First of all, the calibration parameter storing section 60 stores predetermined calibration parameters corresponding to the photographic parameters of the photographic lens section 10 (S100). Subsequently, an object is photographed with the photographic lens section 10 which can adjust the photographic parameters (S102). The photoreceptor section 30 receives the image information formed by the photographic lens section 10 (S104) and the digital image information storing section 40 stores the image information. The image correction section 50 receives the image signal from the photoreceptor section 30 (S106). However, if the image information is stored in the digital image information storing section 40, the image correction section 50 reads the stored image information.

The photographic parameter detecting section 20 detects the photographic parameters of the photographic lens section 10 (S108). The image correction section 50 extracts, from the calibration parameters stored in the calibration parameter storing section 60, the calibration parameters corresponding to the photographic parameters detected at the photographic parameter detecting section 20 (S110). The image correction section 50 performs distortion correction of the image signal, based on the predetermined calibration parameters corresponding to the photographic parameters detected at the photographic parameter detecting section 20 (S112).

EXAMPLE 2

Figure 3:
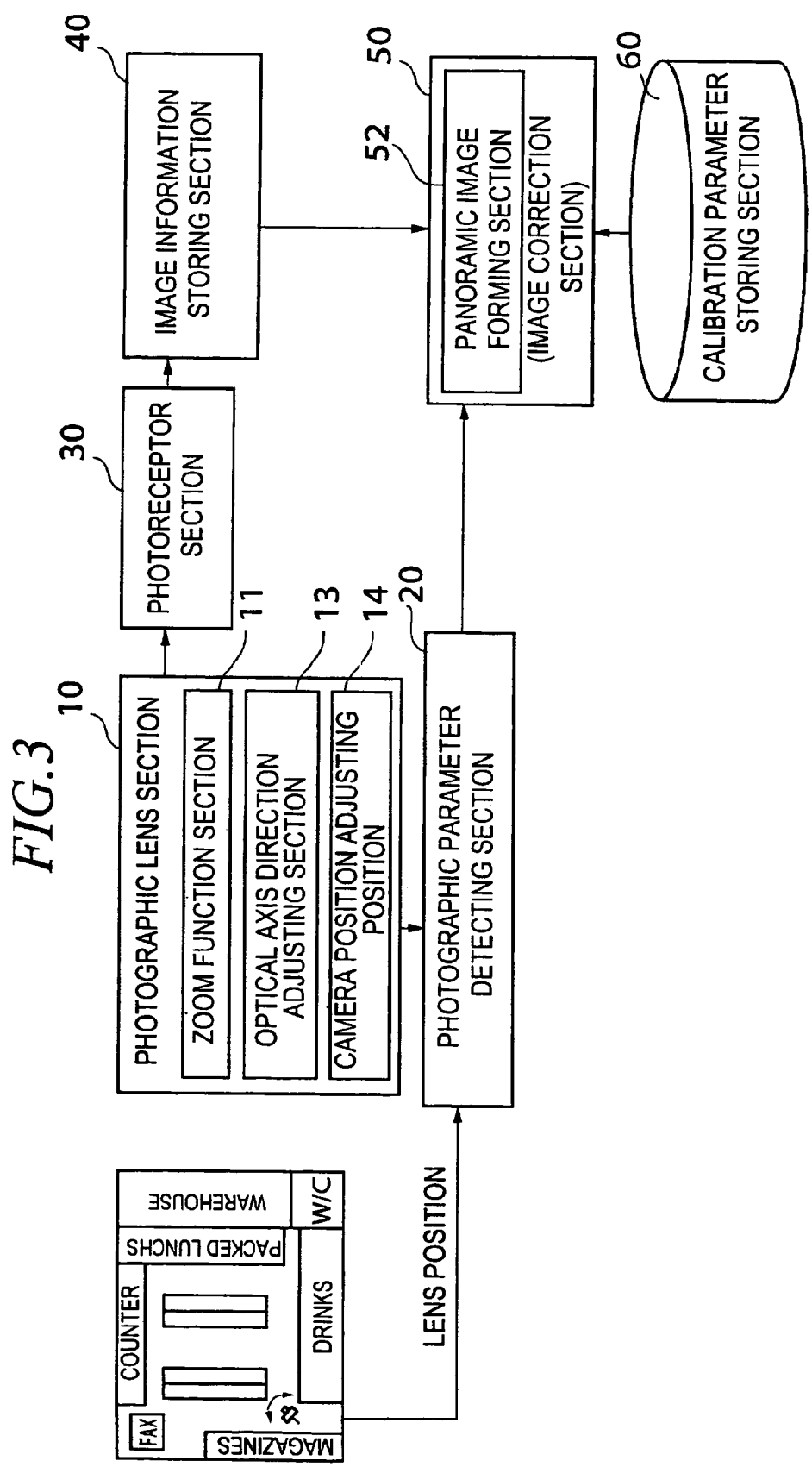
FIG. 3 is an entire block diagram, illustrating a second embodiment of the invention.

FIG. 3 is an overall block diagram, illustrating a second embodiment of the invention. In the figure, the photographic apparatus with a function of image correction according to the invention comprises a photographic lens section 10, a photographic parameter detecting section 20, a photoreceptor section 30, a digital image information storing section 40, an image correction section 50, and a calibration parameter storing section 60. The photographic lens section 10 is located as a monitoring camera, for example, at a convenience store and oscillates periodically (e.g. about 5 seconds of period) within the area to be monitored for photographing criminal acts, such as a shop lifting, of shoppers. Preferably, the photographic lens section 10 has a wide field of view. To this end, for example a wide-angle lens or fish-eye lens is used. The photographic lens section 10 has an optical axis direction adjusting section 13 and a camera position adjustment section 14. With the optical axis direction adjusting section 13, the angular range of oscillation and the angular velocity of the photographic lens section 10 can be adjusted. Also, the camera position adjustment section 14 is in charge of position adjustment if the photographic lens section 10 is allowed to move back and forth, vertically, and right and left, as well as to oscillate. The image correction section 50 is provided with a panoramic image forming section 52 which correlate a plurality of image data having overlapping areas photographed with the photographic lens section 10 to form a panoramic image. The panoramic image forming section 52 performs a successive orientation for each image to joint images each other, which is described later in detail.

Figure 4:
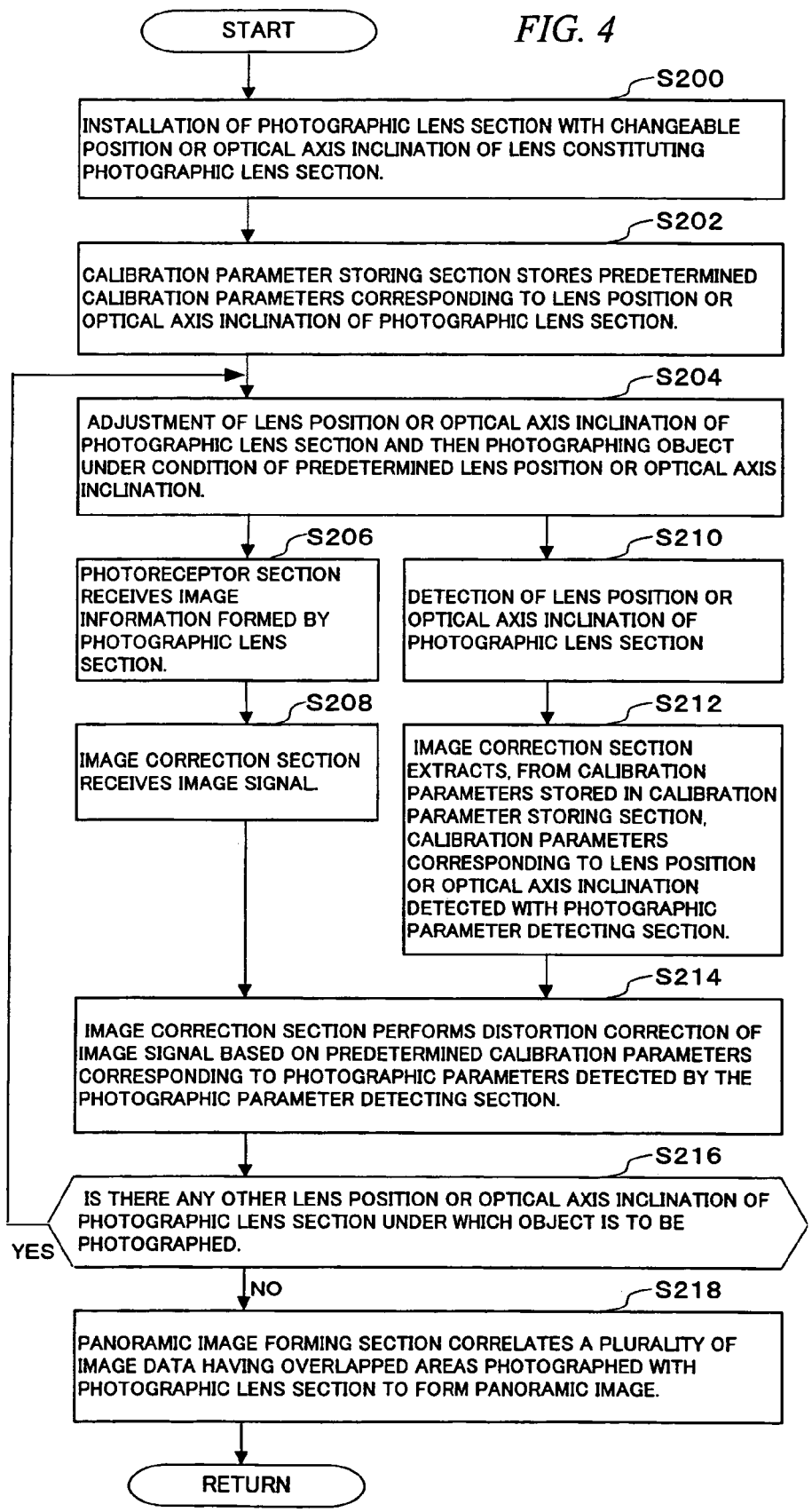
FIG. 4 is a flow chart, illustrating the second embodiment.

Next, referring to the flow chart in FIG. 4, operation of the apparatus of the second embodiment configured in such a way above is described. First of all, the photographic lens section 10 configured to permit the position of the lens constituting the photographic lens section 10 and the inclination of the optical axis to be changed is provided (S200). Also, the calibration parameter storing section 60 stores the predetermined calibration parameters corresponding to the position of the lens or the inclination of the optical axis (S202). In other words, if the photographic lens section 10 is with a zoom function, for example, then it is calibrated for each focal length. Then the calibration parameters, for example a principal position, focal length and lens distortion parameter, of the taking lens section 10 are measured. If the variation with time in the photographic lens section 10 affects on the taking accuracy, the calibration parameters are periodically adjusted using a calibration apparatus. Also, if the photographic lens section 10 is moved to obtain a panoramic image relating to an object, external orientation elements for the lens position and the optical axis inclination of the photographic lens section 10 within the range of the movement are obtained in advance by photographing a chart provided with reference points, such as a three-dimensional calibration field 70 (Refer to FIG. 9). Using the adjoining two images out of the camera images each having a lens position and optical axis inclination of the photographic lens sections 10, an orientation is performed for six or more reference points to calculate an external orientation element at the lens position or the optical axis inclination of each lens of the photographic lens section 10. The external orientation elements include the position and inclination of a camera. The detection of a relative-orientation element is described in the specification of, for example Japanese Patent application 2002-42970, titled "Method and apparatus for processing stereoscopic image." A successive orientation for the image taken in the position and optical axis inclination of each lens is performed by the panoramic image forming section 52, respective parameters are adjusted, the coordinate system is transformed to a standard coordinate system, and then images are jointed by the panoramic image forming section 52.

Subsequently, the lens position or optical axis inclination of the photographic lens section 10 is adjusted and the object is then photographed under the conditions of the predetermined lens position or the optical axis inclination (S204). The photographic apparatus with a function of image correction receives, at the photoreceptor section 30, the image information formed by the photographic lens section 10 (S206) and the digital image information storing section 40 stores the image information. The image correction section 50 receives the image signal from the photoreceptor section 30 (S208). However, if the image information is stored in the digital image information storing section 40, the image correction section 50 reads the stored image information.

The photographic parameter detecting section 20 detects the lens position or the optical axis inclination of the photographic lens section 10 (S210). The image correction section 50 extracts, from the calibration parameters stored in the calibration parameter storing section 60, the calibration parameters corresponding to the lens position or the optical axis inclination detected at the photographic parameter detecting section 20 (S212). The image correction section 50 performs distortion correction of the image signal, based on the predetermined calibration parameters corresponding to the photographic parameters detected at the photographic parameter detecting section 20 (S214). The photographic apparatus with a function of image correction determines whether or not there exists any other lens position or optical axis inclination of the photographic lens section 10 under which the object is to be monitored and/or photographed (S216). If YES then the process returns to the step S204 to adjust the lens position or optical axis inclination of the photographic lens section 10. If NO then the panoramic image forming section 52 correlates a plurality of image data having overlapping areas photographed with the photographic lens section 10 to form a panoramic image (S218).

Even in case of forming a panoramic image, the apparatus may be configured such that a raw image received by the photoreceptor 30, at a position of the photographic lens section 10 being moved or individual image on which distortion correction was performed by the image correction section 50 can be temporarily outputted to an imaging device for monitoring, such as a CRT. A composite panoramic image processed by the panoramic image forming section 52 after the monitoring image has been photographed at each position may be outputted to the image device for monitoring. The image to be outputted to the imaging device for monitoring may be the raw image received by the photoreceptor 30, at a position of the photographic lens section 10 being moved, and/or the individual image on which distortion correction was performed by the image correction section 50, and/or a composite panoramic image. When individual images are jointed to form a composite panoramic image, a successive orientation for each image taken under a condition of the lens position or the optical axis inclination is performed, respective parameters are adjusted, the coordinate system is transformed to a standard coordinate system, and then images are jointed. The composite panoramic image is outputted after individual images for the composite panoramic image have been photographed at the lens positions or the optical axis inclinations corresponding to the individual images, respectively.

EXAMPLE 3

Figure 5:
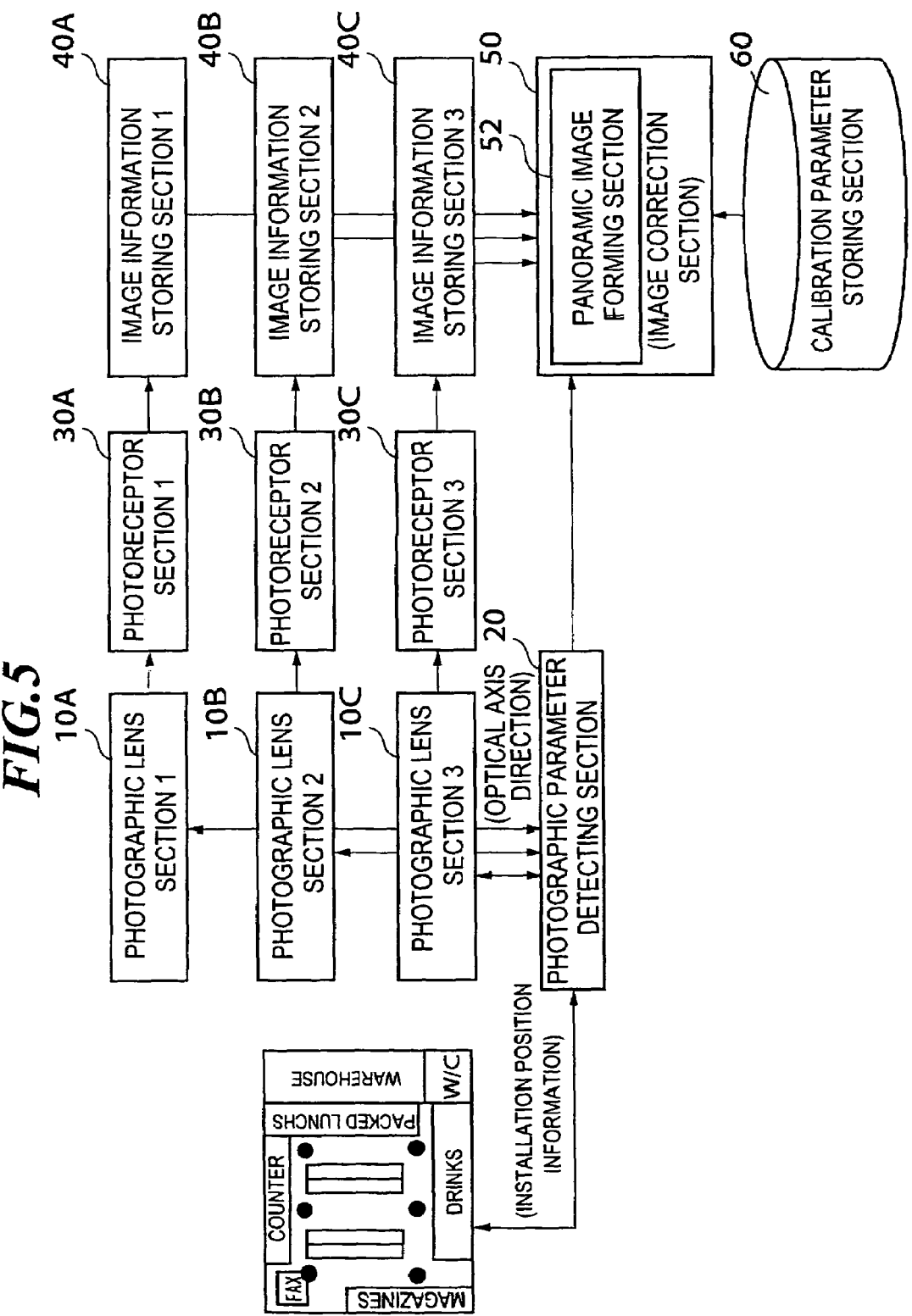
FIG. 5 is an entire block diagram, illustrating a third embodiment of the invention.

FIG. 5 is an overall block diagram, illustrating a third embodiment of the invention. In the figure, the photographic apparatus with a function of image correction according to the invention includes a plurality set of photographic lens sections 10A, 10B and 10C, photoreceptor sections 30A, 30B and 30C, digital image information storing sections 40A, 40B and 40C. Although this embodiment has three sets, it may be two or may be four or more. The apparatus further includes a photographic parameter detecting section 20, a image correction section 50, and a calibration parameter storing section 60. The plural sets of the photographic lens sections are located as a monitoring camera, for example, at a convenience store. The field of view and the focal length of the photographic lens section 10 are determined so as to obtain overlapped areas to be photographed, by combining images taken with each taking lens section 10. Preferably, each photographic lens sections 10A, 10B and 10C has a wide field of view. To this end, for example a wide-angle lens or fish-eye lens is used. The image correction section 50 is provided with a panoramic image forming section 52 for correlating a plurality of image data having overlapping areas which were photographed with the plural sets of the photographic lens section 10A, 10B and 10C to form a panoramic image.

Figure 6:
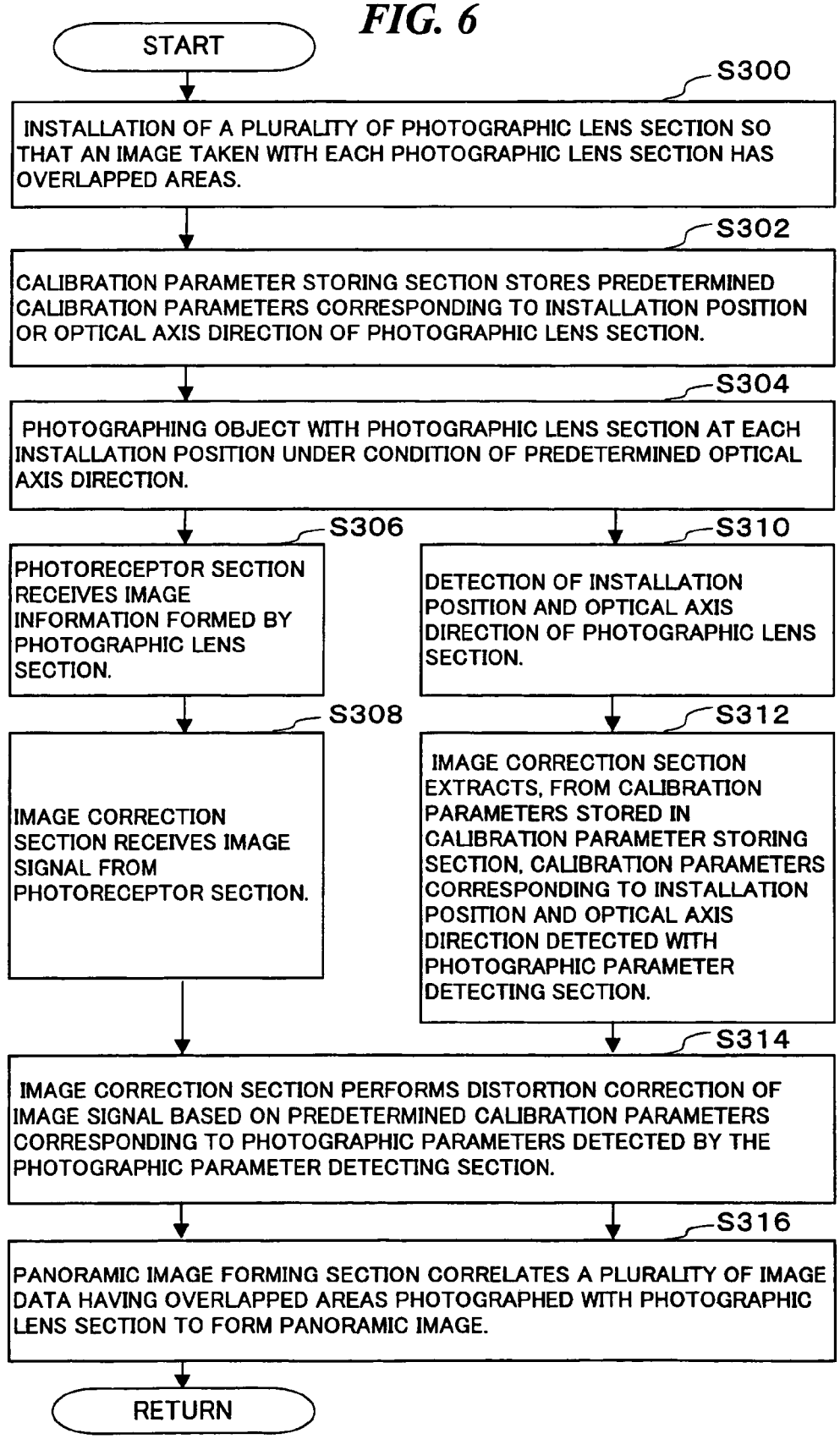
FIG. 6 is a flow chart, illustrating the third embodiment.

Next, referring to the flow chart in FIG. 6, operation of the apparatus of the third embodiment configured in such a way above is described. First of all, a plurality of the photographic lens sections 10 are provided such that there are overlapped areas in the images photographed with the respective photographic lens sections 10A, 10B and 10C (S300). Each photographic lens section 10 photographs a chart provided with reference points for calibration, such as a three-dimensional field 70 for calibration. Using the adjoining two images out of the camera images from the respective photographic lens sections 10A, 10B and 10C, an orientation is performed for six or more reference points to calculate an external orientation element by the panoramic image forming section 52. A successive orientation for the image taken by the respective photographic lens section 10A, 10B and 10C is performed by the panoramic image forming section 52, respective parameters are adjusted, the coordinate system is transformed to a standard coordinate system, and then images are jointed by the panoramic image forming section 52.

The calibration parameter storing section 60 stores predetermined calibration parameters corresponding to the installation position and the optical axis direction (S302). For example, if the photographic lens section 10 with a zoom function is used then it is calibrated in advance on each focal length to obtain calibration parameter therefor. In other words, a principal position, a focal length, and a lens distortion parameter for example, which are included in the calibration parameters of the photographic lens section 10 are measured.

Each photographic lens section 10A, 10B and 10C installed in position photographs an object to be monitored or photographed (S304). The photoreceptor sections 30A, 30B and 30C receive the image information formed by the photographic lens sections 10A, 10B and 10C (S306) and, as required, the digital image information storing sections 40A, 40B and 40C store the image information. The image correction section 50 receives the image signal from the photoreceptor sections 30A, 30B and 30C (S308). However, if the image information is stored in the digital image information storing sections 40A, 40B and 40C, the image correction section 50 reads the stored image information.

The photographic parameter detecting section 20 detects the installation position and the optical axis direction of each of the photographic lens sections 10A, 10B and 10C (S310). The image correction section 50 extracts, from the calibration parameters stored in the calibration parameter storing section 60, the calibration parameters corresponding to the installation position and the optical axis direction detected at the photographic parameter detecting section 20 (S312). The image correction section 50 performs distortion correction of the image signal, based on the predetermined calibration parameters corresponding to the photographic parameters detected at the photographic parameter detecting section 20 (S314). In the photographic apparatus with a function of image correction, the panoramic image forming section 52 correlates a plurality of image data having overlapping areas photographed with the photographic lens sections 10A, 10B and 10C to form a panoramic image (S316). In other words, with the use of the adjusting parameters and external orientation elements predetermined in a step S300, the images of the photographic lens section 10A, 10B and 10C are jointed to display as a panoramic image.

It is an advantage of Example 3 that, since the price of a camera as the photographic apparatus has recently become lower, the investment required for constructing a monitoring system with a number of photographic apparatus is reduced and such system configuration is also relatively simple. In other words, if configured such that the composite images are outputted at the photographic apparatus side, only the panoramic images are stored, instead of storing all photographed images of the photographic lens sections 10A, 10B and 10C. The image memory for storing monitor images can be saved. Also, in the monitoring system, raw images that were photographed with the photographic apparatus and then recorded in videotape or a hard disk may be processed to compose a panoramic image, as required. Further, to correspond the photographic lens sections 10A, 10B and 10C to a plurality of focal lengths, the photographic lens section 10 is moved corresponding to each focal length, or the photographic lens section 10 having a different focus may be installed for each focal length. Also, since the images used for a composite panoramic image are photographed at the same time by the photographic lens section 10A, 10B and 10C, it is not required to suspend outputting the composite panoramic image, as in Example 2, until individual images for the composite panoramic image have been photographed under condition of the lens positions or the optical axis inclinations, respectively. The renewal frequency of the composite panoramic image can be therefore reduced, compared with Example 2. Example 3 is superior as a monitoring system.

EXAMPLE 4

Figure 7:
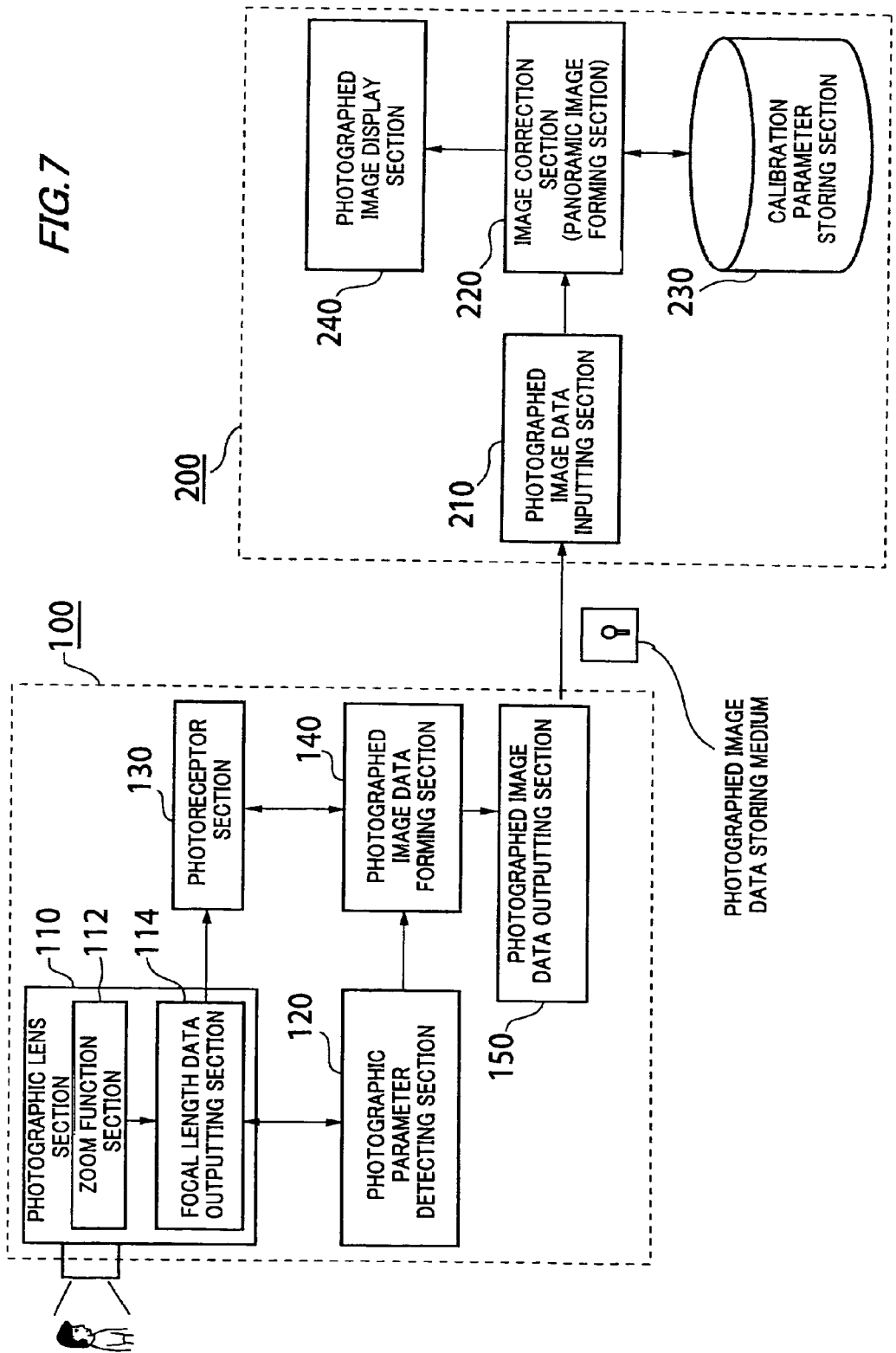
FIG. 7 is an entire block diagram, illustrating a fourth embodiment of the invention.

FIG. 7 is an overall block diagram, illustrating a fourth embodiment of the invention. In the fourth embodiment, the photographic apparatus is configured to output an image on which correction of its lens distortion is not yet performed, and to correct the lens distortion with the use of a photographed image processing apparatus. In the figure, the photographic apparatus 100 of the invention is provided with a photographic lens section 110, a photographic parameter detecting section 120, a photoreceptor section 130, a photographed image data forming section 140, and a photographed image data outputting section 150. Preferably, the photographic lens section has a wide field of view. To this end, a wide-angle lens or fish-eye lens is used for example.

The photographed image data forming section 140 combines the image data outputted from the photoreceptor section 130 with the photographic parameters detected by the photographic parameter detecting section 120 when the image data were obtained by photographing, to form photographed image data. The photographed image data outputting section 150 outputs photographed image data formed by the photographed image data forming section 140. Those photographed image data may be outputted to an electromagnetic recording medium, such as a flexible disk and a CD-ROM, or through data communication via infrared or the Internet connection.

The photographed image processing apparatus 200 includes a photographed data input section 210, an image correction section 220, a calibration parameter storing section 230, a photographic image display section 240. The photographed data input section 210 reads the photographed image data outputted at the photographed image data outputting section 150, into the photographed image data processing apparatus 200. Those data may be read from an electromagnetic storing memory or by a data a receiving function communication via infrared or the Internet connection. The image correction section 220 utilizes the photographic parameters read at the photographed image data input section 210 to correct the photographed image data. The calibration parameter storing section 230 stores the predetermined parameters corresponding to the photographic parameters. The photographic image display section 240 may s display the photographed image data which were read at the photographed image data inputting section 210 and not yet subject to image correction, or may display the photographed image data to which image correction was performed. For the photographed image display section 240, a CRT or liquid crystal display having a screen of a standard size may be used. A screen having a large width suitable to display a panoramic image may be preferred.

Figure 8:
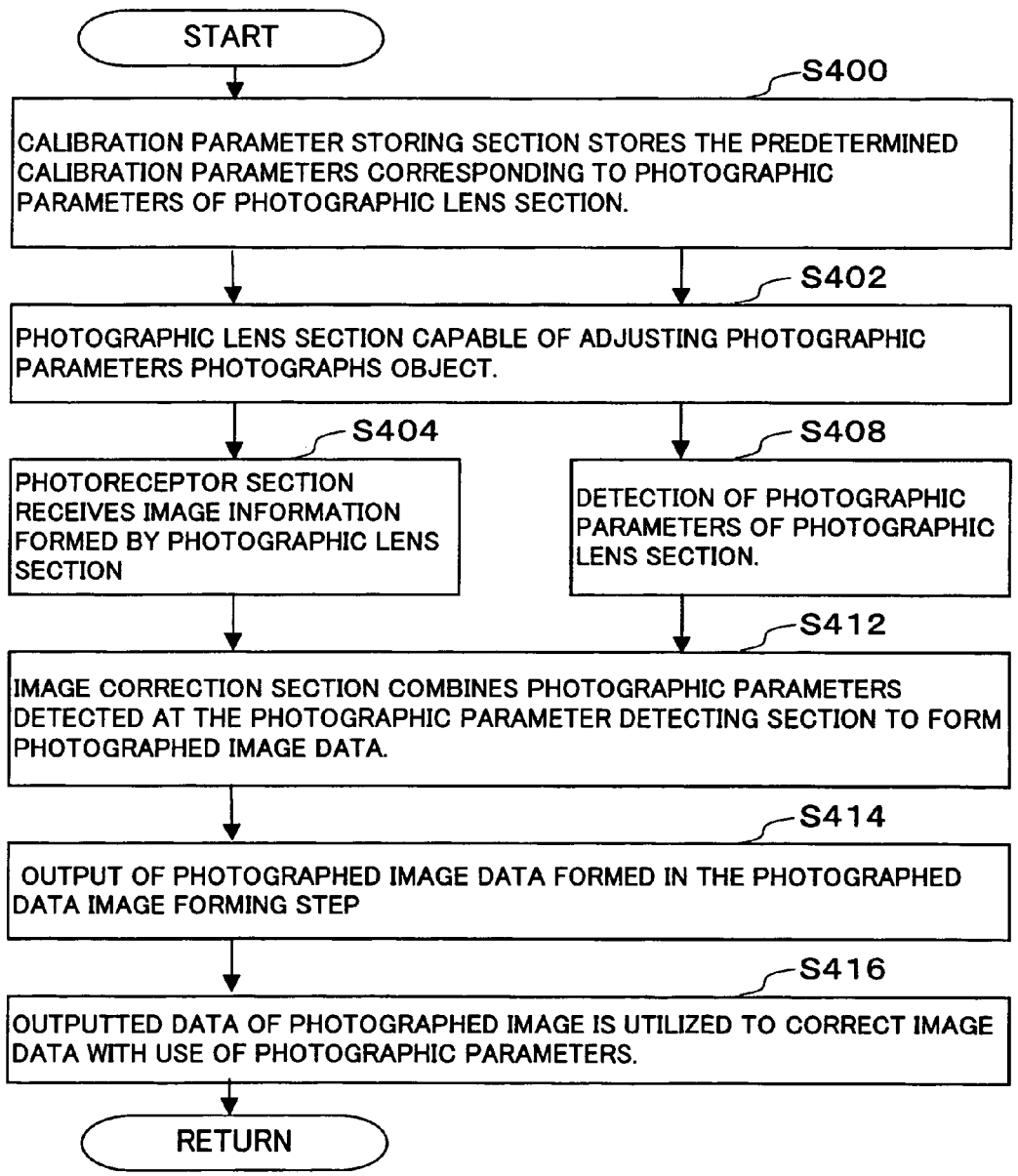
FIG. 8 is a flow chart, illustrating the fourth embodiment.

Next, referring to the flow chart in FIG. 8, operation of the apparatus of the fourth embodiment configured in such a way above is described. First of all, the calibration parameter storing section 230 stores predetermined calibration parameters corresponding to the photographic parameters of the photographic lens section 110 (S400). Subsequently, the photographic lens section 10 which can regulates the photographic parameters photographs an object (S402). The photoreceptor section 130 receives the image information formed by the photographic lens section 110 (S404).

The photographic parameter detecting section 120 detects the photographic parameters of the photographic lens section 110 (S408). The photographed image data forming section 140 combines the photographed parameters detected at the photographic parameter detecting section 120 to form photographed image data (S412). The photographic image data outputting section 150 outputs the photographed image data formed at the photographed data image forming step S412 (S414). The photographed image data outputted is utilized by the photographed image processing apparatus 200 to correct the photographed image data with the use of the photographic parameters (S416). In other words, the image correction section 220 extracts, from the calibration parameters stored in the calibration parameter storing section 230, the calibration parameters corresponding to the photographic parameters of the photographed image data read at the photographed image data inputting section 210 to perform the photographed image data correction.

Additionally, in the embodiment described above, if a zoom lens is used as the photographic lens sections 10, 110, it is possible to photograph an image at each focal length to prepare and display an image at each focal length on which image joint is performed. In this case, since the camera of the photographic lens section has a different position according to the focal length (due to different magnification of the photographic lens section) an image memory is used to store the data classified every focal length. In such a way, the use of the image to which image joint is performed at each focal length is advantageous to freely select the field of view for photographing an object to be photographed or monitored while the photographic position of the camera is fixed at its installation position.

[Calibration of a Zoom Lens]

Figure 9:
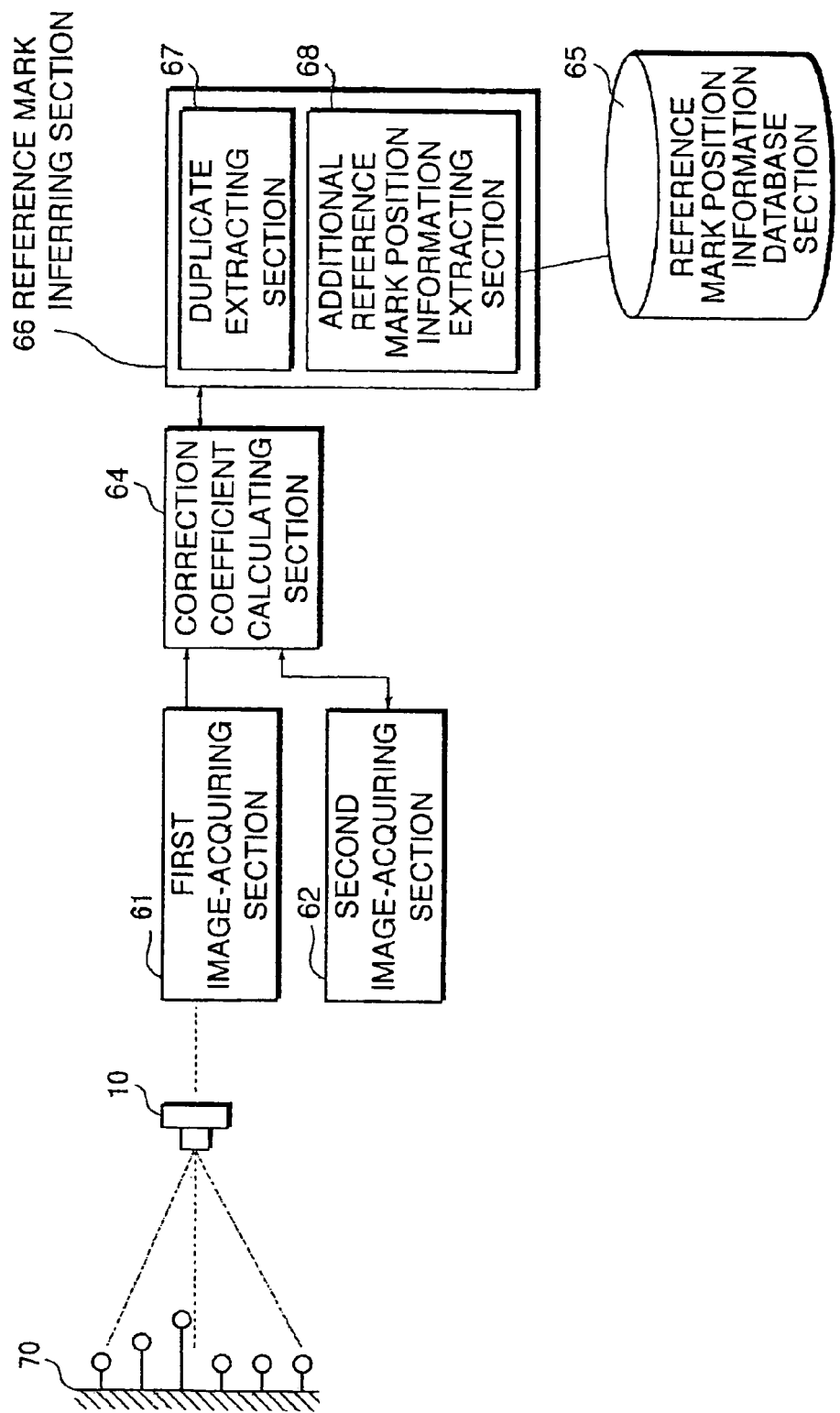
FIG. 9 is an elementary block diagram of a calibration system for the photographic parameters of a zoom lens.

Now, referring to FIG. 9 and the drawings following thereon, the items mentioned in the Embodiments 1 to 4 are described in detail. In the calibration of a zoom lens, a three-dimensional field for calibration is hereinafter described. FIG. 9 is a substantial block diagram of a calibration system for photographic parameters of a zoom lens. In the figure, an apparatus for calibrating a zoom lens includes a first image-acquiring section 61, a second image-acquiring section 62, a correction coefficient calculating section 64, a reference mark position information database section 65, and a reference mark inferring section 66. The reference mark inferring section 66 includes a duplicate reference mark extracting section 67 and an additional reference mark position information extracting section 68. A digital camera and a video camera, for example, each of which has a zoom lens of a variable focal length type, are used as a photographic lens section 10 to be calibrated.

An image can be acquired with the photographic lens section 10 by variably and continuously adjusting the focal length, utilizing the zoom function of the photographic lens section 10.

The first image-acquiring section 61 acquires a first image-for-calibration by photographing an area, where reference marks for calibration are positioned (this area is hereinafter referred to as a three-dimensional field for calibration 70), with a photographic lens section 10 whose focal length is set to a first focal length. The second image-acquiring section 62 acquires a second image-for-calibration by photographing the three-dimensional field for calibration 70, with the photographic lens section 10 whose focal length is set to a second focal length. Here, the first and second focal lengths of the photographic lens section 10 are set to be close to each other and both reference marks for calibration that are projected in the first and second image-for-calibrations, respectively, are similar to each other. This allows a smooth calibration work. When the photographic lens section 10 has a large zoom ratio, the focal length is changed in a multi-step manner with the ratio of the second focal length and the first focal length being kept smaller (for example 1.2 to 1.5). Then, for the focal length preset in a multi-step, each set of the first and second focal lengths to be read may be changed one by one using a neighboring set of the first and second focal lengths. Use of a zoom function to continuously adjust the focal length permits to exactly show a relation in which the calibration correction coefficient of the photographic lens section 10 depends on the focal length. Also, by keeping the ratio of the first focal length and the second focal length smaller and by setting suitably the number of steps for changes, the calibration correction coefficient can be efficiently obtained without vain increase of the number of focal lengths to be measured. By the way, each calibration correction coefficients between steps can be obtained, using an interpolation.

With the use of the reference marks for calibration projected in the first and second image-for-calibrations, the correction coefficient calculating section 64 calculates respective correction coefficients for the first and second focal lengths of the photographic lens section 10, which will be later described in detail. In the reference mark position information database section 65 is stored three-dimensional position information of the reference marks in the three-dimensional field for calibration 70. The reference mark inferring section 66 infers a positional relationship of the photographed reference marks for calibration projected in the second image-for-calibration, with the use of the positional information of the photographed reference marks for calibration projected in the first image-for-calibration. Such an inference permits to narrow the area where the corresponding reference mark is searched for and to increase the efficiency of the search. Since the focal length of the photographic lens section 10 can be varied continuously, the search area and the template size for use in the correction coefficient calculating section 64 can be also automatically varied using the information on the zoom ratio defined by the focal length.

The duplicate reference mark extracting section 67 extracts a group of the reference marks matched between the photographed reference marks for calibration in the first image-for-calibration and the photographed reference marks for calibration in the second image-for-calibration. If the focal distance is changed (if zoomed) then typically the number of the reference marks included in the first image-for-calibration is different from that of the reference marks included in the second image-for-calibration. The additional reference mark position information extracting section 68 extracts, from the reference mark image in the second image-for-calibration, additional reference marks any reference marks corresponding to which do not exist in the first image-for-calibration, and reads the three-dimensional position information relating to the additional reference marks with reference to the reference mark position information database section 65.

Figure 10:
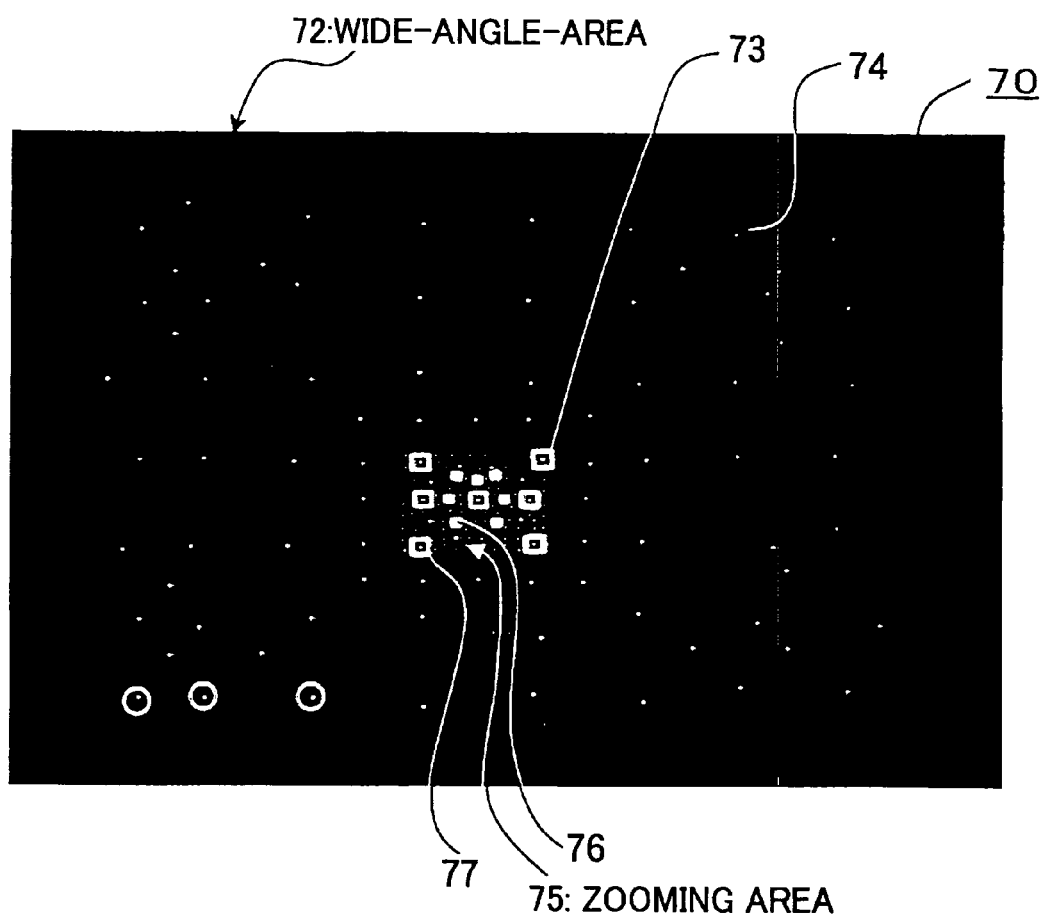
FIG. 10 is an overall view, illustrating a three-dimensional field for calibration.
Figure 11:
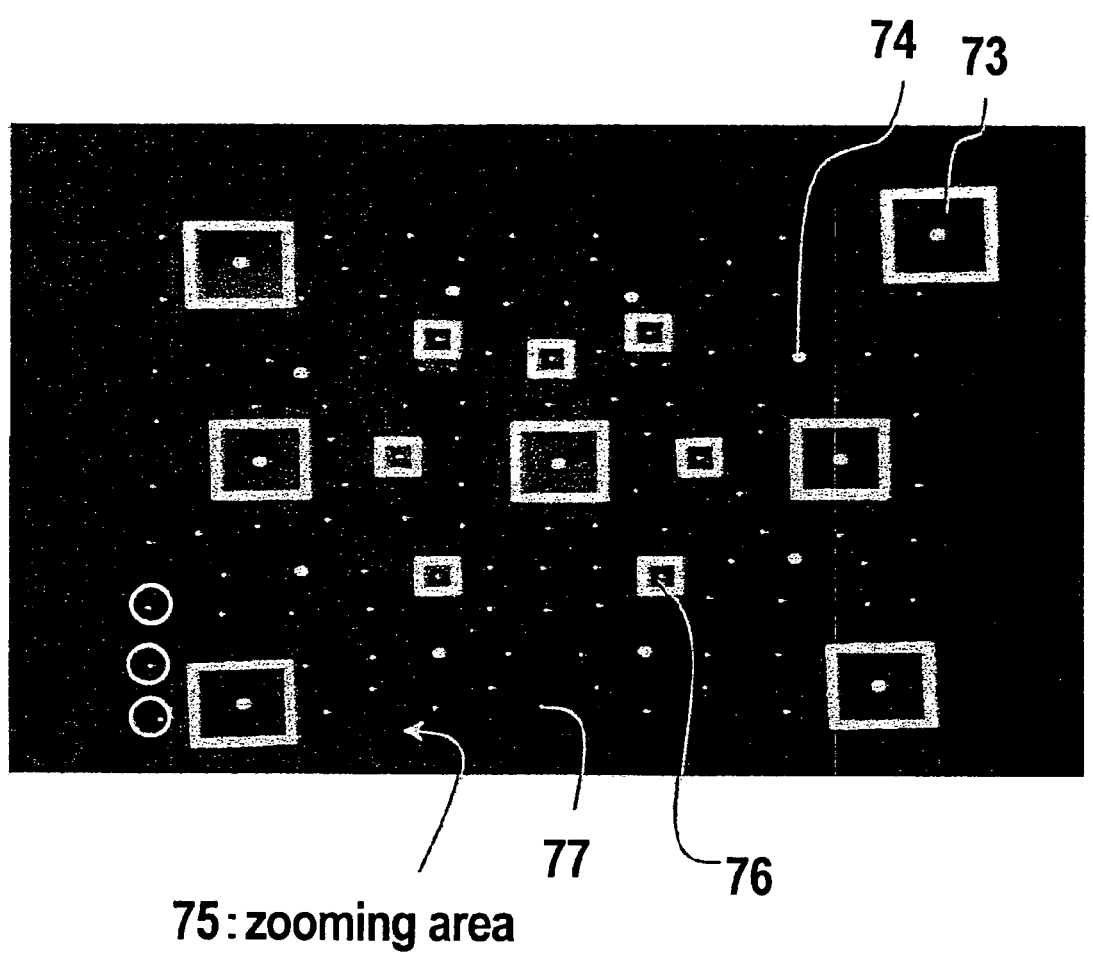
FIG. 11 is an enlarged and elementary illustration of a zoom area of the three-dimensional field for calibration.

FIG. 10 is an overall view, illustrating a three-dimensional field for calibration which is shown as a light and shade binary image. FIG. 11 is a partially enlarged view of a three-dimensional field for calibration in FIG. 10, showing a zoom area as a light and shade binary image. In these figures, the three-dimensional field for calibration 70 has a wide-angle area 72 and a zoom area 75 located within an area overlapped with the wide-angle area 72.

The wide-angle area 72 is used to take a calibration image on the wide-angle side of a zoom lens and also provided with a rough alignment reference marks 73 for wide-angle for use in rough alignment in a photographed calibration image and provided with precise alignment reference marks 74 for wide-angle for use in precise alignment in the photographed calibration image. In the vicinity of the zoom area 75 are provided seven rough alignment reference marks 73 for wide-angle so that it is secured to photograph even though the zoom lens has a smaller angle of view. For example, 100 to 200 of the precise alignment reference marks 74 for wide-angle are evenly distributed with a density so as to be projected evenly on a photographed calibration image. The rough alignment reference marks 73 for wide-angle are configured by a center in a shape of, for example, a circle (a star and a triangle also permitted) identical to that of the precise alignment reference marks 74 for wide angle; and a closing line in a shape of a rectangular which circumscribes the center. Alternatively, the closing line may be in a shape of a circle and a polygon including a triangle. In other words, any other shapes by which the rough alignment reference mark 73 for wide-angle can be clearly identified may be used.

The zoom area 75 is used to take a calibration image on the zoom-in side ("zoom-in" may be hereinafter just referred to as "zoom") of the zoom lens and also provided with rough alignment reference marks 76 for zooming for use in rough alignment in a photographed calibration image and provided with precise alignment reference marks 77 for zooming for use in precise alignment in the photographed calibration image. Since the zoom area 75 is located in a small area surrounded by the wide-angle area 72, the calibration image can be photographed with a zoom lens which has a small angle of view and of which focal length is set on the zoom side, even if an distance between the photographic camera and the three-dimensional field is not enough.

In the vicinity of the center of the zoom area 75 are provided seven rough alignment reference marks 76 for zooming so that it is secured to photograph even though the zoom lens has a smaller angle of view. For example, 100 to 200 of the precise alignment reference marks 77 for zooming are evenly distributed with a density so as to be projected evenly on the photographed calibration image. The rough alignment reference marks 76 for zooming have a center point and a square closing line enclosing the center point, each in the same shape as of the precise alignment reference marks 77 for zooming. Alternatively, the closing line may be in a shape of a circle and a polygon including a triangle in place of the square. In other words, any other shape by which the rough alignment reference mark 76 for zooming can be clearly identified may be used.

The rough alignment reference marks 73 for wide-angle have a geometry larger than that of the rough alignment reference marks 76 for zooming; and the precise alignment reference marks 74 for wide-angle have a geometry larger than that of the precise alignment reference 77 marks for zooming. Accordingly, the reference marks 76, 77 for zooming which were photographed on the wide-angle side of the zoom lens have a small size in the photographed calibration image. It is therefore easy to identify the reference marks 73, 74 for wide-angle. Also, the reference marks 76, 77 for zooming which were photographed on the zoom side of the zoom lens are projected with a size suitable to be identified in the photographed calibration image.

For each of the reference marks 73, 74, 76, 77, a reflective reference target having a high reflectivity is used, resulting in an easy photographing of a calibration image as a light and shade binary image. By use of a reference mark having a high reflectivity, such as a glass plate, on which aluminum is deposited, the reference marks having a high brightness are projected on a photographed calibration image. It is therefore easy to obtain a sufficient contrast between the reference marks and the background of the three-dimensional field for calibration 70. The height of the reference mark is adjusted by changing the height of the target board from the surface of a concrete wall, for example. Evenly locating the reference marks having a variety of heights all over the calibration image, internal parameters of the zoom lens to be calibrated are exactly calculated.

Figure 12:
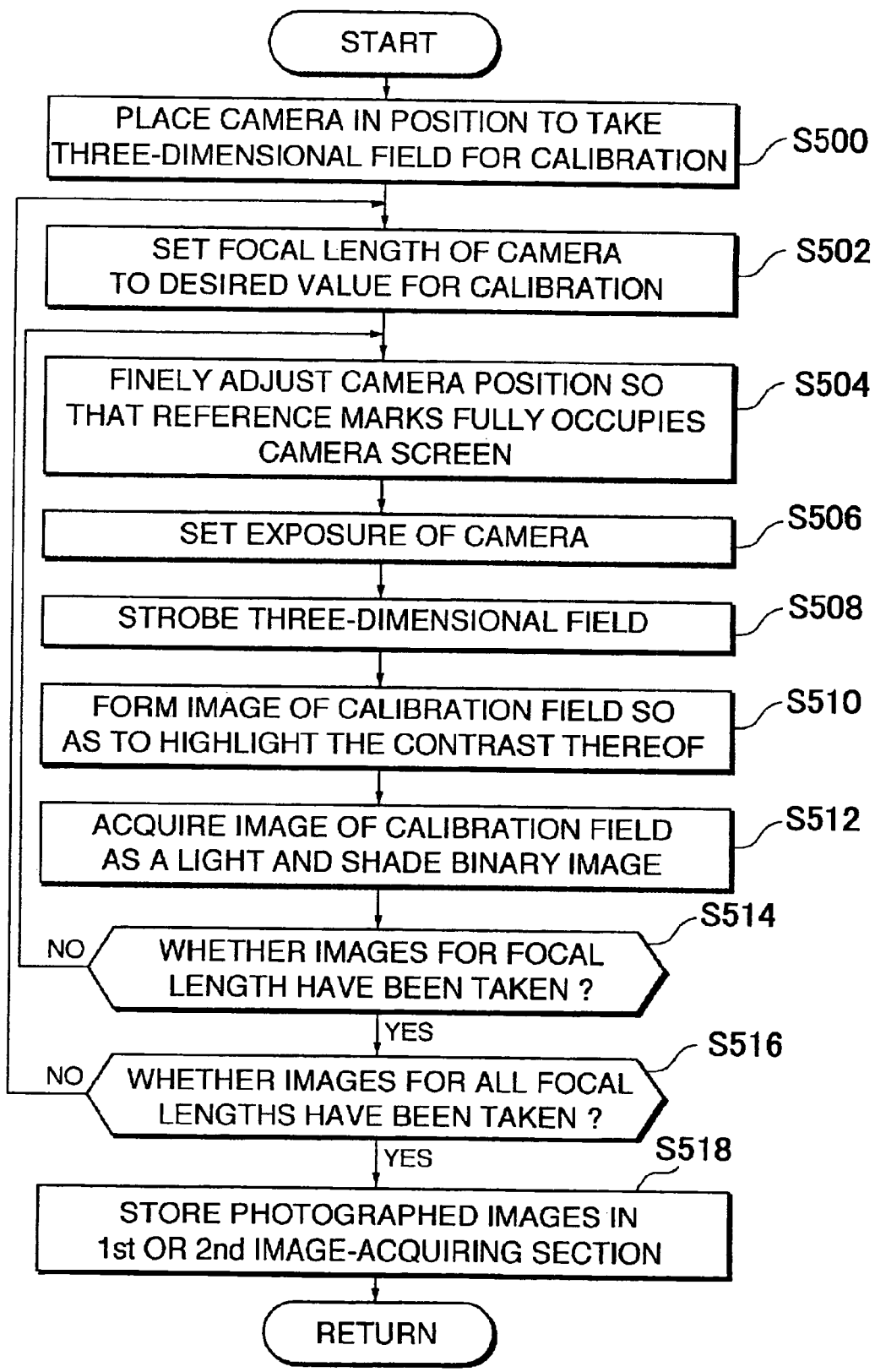
FIG. 12 is a flow chart, illustrating a procedure of photographing, with a zoom lens to be calibrated, a three-dimensional field for calibration.

FIG. 12 is a flow chart, illustrating a procedure of photographing the three-dimensional field for calibration 70 with a zoom lens to be calibrated. First, the photographic lens section 10 (or a camera with a zoom lens to be calibrated) is placed in position to photograph the three-dimensional field for calibration 70 (S500). The focal length of the photographic lens section 10 is then set to a desired value for calibration (S502). The focal length is preferably set to a value on the wide-angle side of the zoom lens, but may be on the zoom side. Next, the position of the camera is adjusted so that the reference marks in the three-dimensional field for calibration 70 can fully occupy the screen of the photographic lens section 10 (S504). In the photographic lens section 10, if the focal length thereof is on the wide-angle side then it is set such that the reference marks 73, 74 for wide-angle are projected. If on the zoom side then the focal length is set such that the reference marks 76, 77 are projected.

Then the exposure of the camera for photographing a calibration chart is set to be underexposed for an background excluding the reference marks of the three-dimensional field for calibration 70, and to be overexposed for the reference marks of the three-dimensional field for calibration 70 (S506). Secondly, the three-dimensional field for calibration 70 is taken by stroboscopic photography with the camera for photographing a calibration chart (S508). In this step, since the calibration chart can be photographed with the zoom lens for which aperture is closed at a minimum extent, a depth of field becomes deep. It is therefore easy to obtain a clear image for analysis even if be photographed out of focus.

Subsequently, the image of the calibration chart is developed so as to highlight the contrast thereof (S510). The image of the calibration chart photographed in such a manner is a binary image in which a background image, such as a concrete wall surface, of the three-dimensional field for calibration is shaded and both the reference marks 73, 74 for wide-angle and the reference marks 76, 77 are lightened (S512).

Subsequently, it is determined whether all of the images necessary for calibration have been taken by the photographic lens section 10 (S514). After completion of taking the required number of images for one focal length, it is determined whether or not images have been taken for all of the required focal lengths by the photographic lens section 10 (S516). If determined not to be completed at the step S516, the process returns to the step S502 to perform again the steps for next focal length necessary for calibration and repeats these steps, if required. For example, the zoom lens of the photographic lens section 10 is adjusted for desired number of focal lengths to be interpolated and steps S502 to S516 are performed repeatedly. It is preferred that the number of the focal length for calibration images for the photographic lens section 10 is determined depending on a required accuracy of calibration. The number of the focal length may be also determined depending on the range of the zoom lens. The minimum number of the focal length is two. Three or more focal lengths may be also allowed. If the number of the focal length is five in a range from the wide-angle to the zoom areas of the photographic lens section 10, then the sequential steps will be repeatedly performed five times. Accordingly, when the focal length of the photographic lens section 10 is changed, the position of the camera is correspondingly changed so that the calibration image can be taken so as to fully occupy the screen of the photographic lens section 10. These sequential steps are repeated.

After completion of taking calibration images with the photographic lens section 10, the photographed calibration images are stored in the first image-acquiring section 61 or second image-acquiring section 62 (S518). The calibration images may be stored in an electromagnetic memory medium, such as FD for example, or may be transferred as image data to a calibrating apparatus via Internet. When the step S518 has been completed, the process is returned.

The image of the calibration chart obtained in a way as described, is used for comparatively calculating the measured three-dimensional position of the developed binary image and the three-dimensional coordinates of the reference marks 73, 74 for wide-angle and the reference marks 76, 77 for zooming to analytically obtain internal parameters (a principal point position, screen distance and distortion parameter) of the camera for every focal length of the zoom lens. The background area, excluding the reference marks of the three-dimensional field for calibration 70, is brought to an evenly shaded area of the image. Accordingly, in a calibration work as a post-process using the image of the calibration chart, both the reference marks 73, 74 for wide-angle and the reference marks 76, 77 for zooming can be exactly detected. For example, the experiment performed by the inventors shows that the detection accuracy of a median point (center of gravity) of the reference mark (target) is approximately $\frac{1}{10}$ in the binary image, while that in the image on which a wall surface in the background was projected is approximately $\frac{1}{4}$, that is, degraded about two to three times of the former.

Although, in such a calibration system for a zoom lens as described above, both the reference marks for wide-angle and the reference marks for zooming are commonly fixed on the wall surface, the three-dimensional field for calibration as an area where the reference marks for calibration are positioned is not limited to it. For example, while the reference marks for wide-angle are fixed to a wall surface, the reference marks for zooming may be fixed to a movable panel. By adequately positioning the movable panel relatively to the wall surface, the reference marks for wide-angle and the reference marks for zooming may be positioned.

[Description of a Calibration Apparatus]

Figure 13:
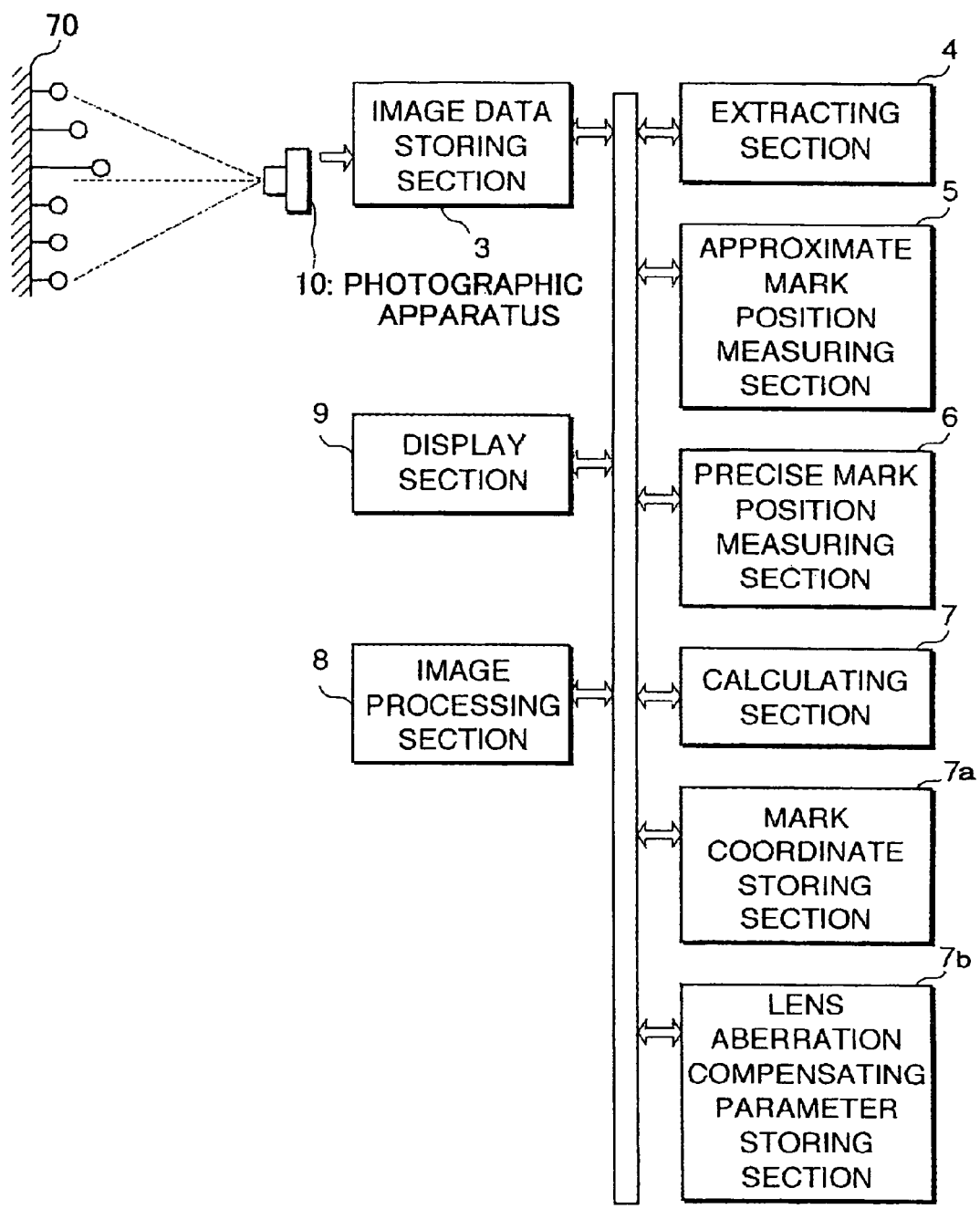
FIG. 13 is an overall block diagram, illustrating a calibrating apparatus.

Next, referring to FIG. 13 showing an overall block diagram, a calibration apparatus and operation procedures thereof are described. FIG. 13 is the overall block diagram, illustrating the calibrating apparatus to which this invention is applied. A three-dimensional field for calibration 70 has reference marks for both wide-angle and zooming as described referring to FIG. 10 and FIG. 11, for example. A photographic lens section 10 is, as has been described, typically a camera with a zoom lens to be calibrated, but may be a wide angle lens or a fish eye lens.

An image data storing section 3 corresponds to the first or second image-acquiring sections 61, 62 which uses herein a memory, for example an electromagnetic storing medium, such as a magnetic disk and a CD-ROM, for storing the calibration image data from the photographic lens section 10. In the image data storing section 3, it is preferred that the calibration images stored in the first or second image-acquiring sections 61, 62 are stored in a mode allowing to determine the focal length in photographing. The calibration image data correspond to the first or second images for calibration.

The calibrating apparatus has an extracting section 4, an approximate mark position measuring section 5, a precise mark position measuring section 6, an calculating section 7, an image processing section 8, a mark coordinate storing section 7a, and a lens aberration compensating parameter storing section 7b, and also has an image data storing section 3 and a display section 9 as external devices. The calibrating apparatus may comprise a computer on which a Celeron (trademark) or Pentium (trademark) of Intel is installed as a CPU. The correction coefficient calculating section 64 can be realized with the functions of the extracting section 4, the approximate mark position measuring section 5, the precise mark position measuring section 6, the calculating section 7 and the image processing section 8. Further, the extracting section 4 and/or the approximate mark position measuring section 5 uses a function of the reference mark inferring section 66 to rapidly detect, with the use of the focal length information of the photographic lens section 10, the positions of the reference marks in the three-dimensional field for calibration 70.

The extracting section 4 performs a first mark extracting operation to extract the first marks from the image data stored in the image data storing section 3 and obtain the image coordinate values of the first marks. In the reference mark inferring section 66, with the use of the reference mark position information on the three-dimensional field for calibration 70 which was acquired at the previous focal length, the positional relation of the reference marks projected in the second image-for-calibration at the present focal length is inferred. The first mark extracting operation as a pre-process prior to calculating and correlating the approximate positions of the second marks is performed by the approximate mark position measuring section 5. The image coordinate values of the first marks are stored in the mark coordinate storing section 7a. The term first mark herein means rough alignment reference mark 73 for wide-angle and rough alignment reference mark 76 for zooming. The term second mark herein means precise alignment reference mark 74 for wide-angle and precise alignment reference mark 77 for zooming. The operation of extracting the first marks using the reference mark inferring section 66 by the extracting section 4 will be described later in detail.

The approximate mark position measuring section 5 performs projection conversion to obtain exterior orientation element from the image coordinate values of the first marks extracted in the extracting section 4, and calculates the approximate positions of the second marks using the single-photograph orientation theorem and a collinearity condition expression to correlate a pair of images for calibration. In the process of calculating the approximate positions of the second marks, the second marks are efficiently extracted for each focal length by the approximate mark position measuring section 5 using the reference mark inferring section 66.

The precise mark position measuring section 6 recognizes the second marks on the paired images for calibration and calculates the positions of the second marks precisely using a detection method of center of gravity position, for example. When there are second marks whose positions are calculated by the precise mark position measuring section 6 are significantly contradicts the positions of other second marks in the image data of the three-dimensional field 70 for calibration, the calculating section 7 removes the positions of such contradicting second marks. The calculating section 7 extracts a second mark suitable for calibration from the second marks which have been calculated in the precise mark position measuring section 6 to adjust the exterior orientation elements and the objective coordinates thereof simultaneously, and calculates the internal parameters of the photographic lens section 10. It is preferred that the lens aberration compensating parameter storing section 7b stores the calculated internal parameters of the photographic lens section 10. The internal parameters of the photographic lens section 10 include the principle point position, the screen distance and the distortion parameters. Although only distortion parameters are herein obtained, the spherical aberration, coma, astigmatism and curvature of field comprising Seidel's five aberrations may be obtained. The internal parameters obtained in the calculating section 7 are displayed on the display section 9 in graphical form.

The image processing section 8 rearranges the data of an image photographed with the photographic lens section 10 (especially, an image of other than the three-dimensional field 70 for calibration) using the internal parameters calculated in the calculating section 7. Then, the image photographed with the photographic lens section 10 is displayed on the display section 9 as a low distortion image almost free from lens aberration. The display section 9 is an image display device such as a CRT or a liquid crystal display.

In the mark coordinate storing section 7a are stored the image coordinate values of the first marks in the calibration image taken for each focal length and also stored the image coordinate values of the second marks. Preferably, the mark coordinate storing section 7a also stores the three-dimensional position information of the reference marks in the three-dimensional field 70 for calibration, which information has been stored in the reference mark position information database section 65 described above. In the lens aberration compensating parameter storing section 7b are stored, together with the focal lengths of the photographic lens section 10, the calibration correction coefficient as an internal parameter of the photographic lens section 10 which was calculated by the calculating section 7.

Figure 14:
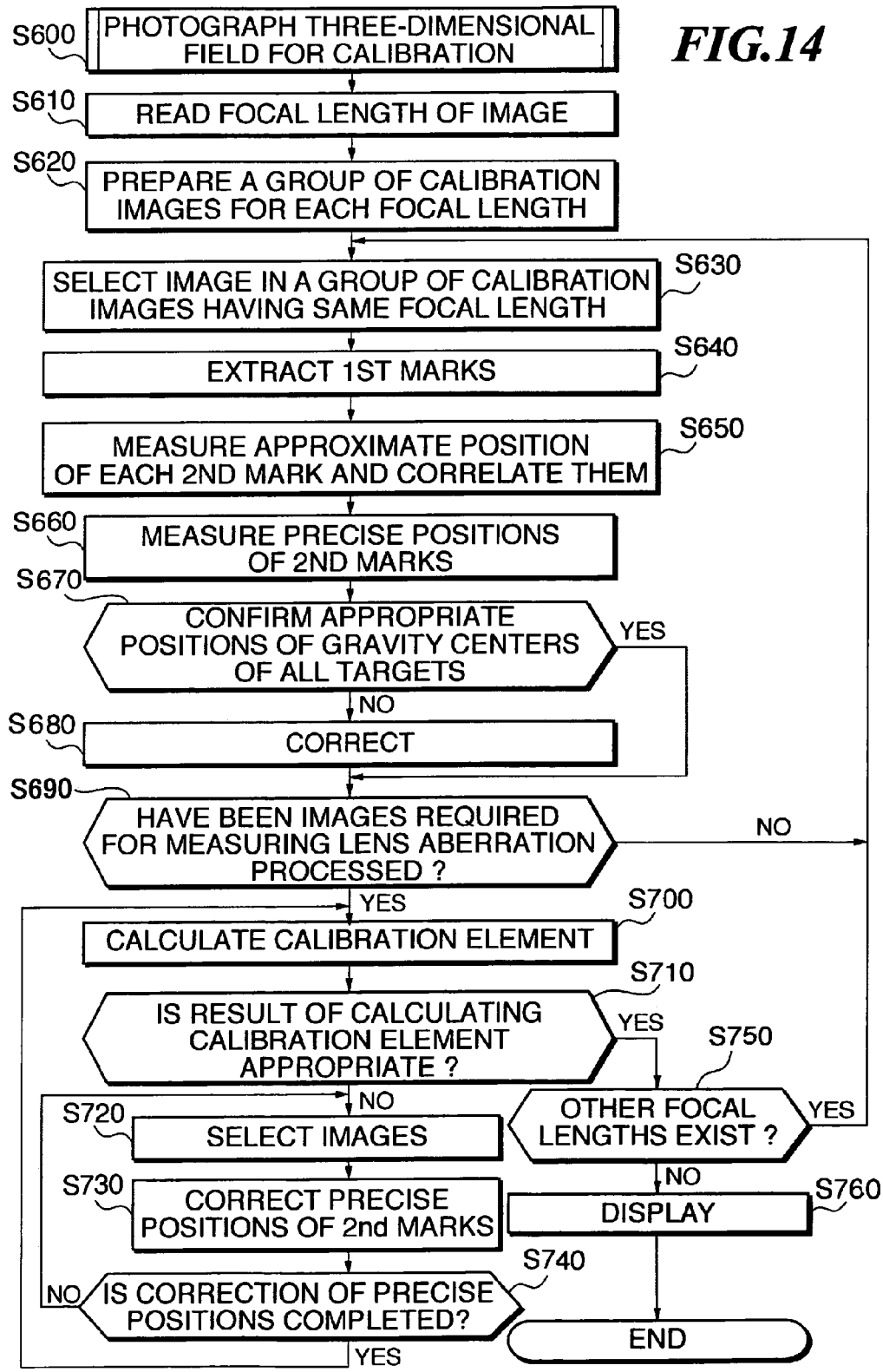
FIG. 14 is a flowchart for explaining the overall calibrating operation.

Referring to FIG. 14, description will be made of the overall flow of a calibration process using a calibrating apparatus of an embodiment according to the present invention. FIG. 14 is a flowchart for explaining the overall calibrating process. First, the focal length of the photographic lens section 10, the lens aberration of which will be compensated, is set to a predetermined value and the three-dimensional field 70 for calibration is then photographed (S600). These steps are described in detail in steps S502 to S514 in the flow chart of FIG. 12, for example.

Subsequently, with respect to the calibration image stored in the image data 15 storing section 3, the position of each focus which is recorded on the image is read (S610). Then, for the calibration image, a group of calibration images for each focal length is prepared as a group of images having the same focal length of the photographic lens section 10 (S620).

An image to be processed at present is then selected from the group of calibrating images which was prepared for each focal length (S630). That is, the calibrating apparatus reads the image data in the selected group of calibration images from the image data storing section 3 and displays the read image on the display section 9. Then, the operator selects images on which correlating and measurement of targets are performed, from the images displayed on the display section 9. Then, the extracting section 4 extracts the first marks with respect to the selected images (S640).

(I): First Mark Extraction Process

In the first mark extraction process, in order to determine second-order equations for projection conversion of the three-dimensional field 70 for calibration and the plane coordinates thereof into image coordinates thereof (camera side), the positions of at least three first marks out of the first marks on the plane coordinate system are measured on the image data. Here, since the first marks include the second marks therein, the positions of the first marks can be designated precisely by designating the positions of the second marks included in the first marks. In the first mark extraction process, the steps I-(1) to I-(4) are repeated for all the first marks. That is, in the reference marks for wide-angle and the reference marks for zooming, as described referring to FIG. 10 and FIG. 11, there are provided the precise alignment reference marks 74 for wide-angle within the area of the rough alignment reference marks 73 for wide-angle, and also provided the precise alignment reference marks 77 for zooming within the area of the rough alignment reference marks 76 for zooming.

(I-1): The operator points the cursor of the mouse to the second mark in the first mark to be detected on the entire image displayed on the display section 9 and clicks the mouse thereon to obtain the approximate position of the first mark.

(I-2): The operator designates an area including the coordinates of the first mark obtained in step (I-1) and the second marks around it from an enlarged view and displays it. At this time, the image including the second marks can be used as a template in measuring the precise positions of the second marks.

I-(3): The operator points the cursor to the gravity center of the second mark on the enlarged image displayed in the step I-(2) and clicks the mouse thereon to make the coordinates the position of the gravity center of the first mark. The positioning in step I-(3) may not be precise because correlating the approximate positions will be performed in a later process.

I-(4): The operator inputs the management number of the second mark corresponding to the position of the gravity center of the first mark measured in step I-(3) to correlate it to the management number of the second mark stored in the mark coordinate storing section 7a. At this time, the position of the gravity center of the first mark measured in step I-(3) is attached to the management number of the second mark as reference coordinates.

In the first mark extraction process, when the order of measuring the first marks, for example, on the three-dimensional field 70 for calibration are determined in advance, the numbering process can be automatically performed on the extracting section 4 side even if the operator does not input the management number of the second mark. In the first marks extraction process, for example, the selected image displayed on the display section 9 may be divided into two sections: the entire image, as shown in FIG. 10 and FIG. 11, in one half of the screen and the enlarged image of a single rough alignment reference mark 73 for wide angle or a single rough alignment reference mark 76 for zooming in the other half of the screen may facilitate the position measurement work.

The first mark extraction process may be performed using only an entire image as shown in FIG. 10 and FIG. 11 without use of an enlarged image. In this case, the step I-(1) is performed and then the process performed in step I-(4) in the above process, namely the input of the management number of the second mark corresponding to the position of the gravity center of the first mark measured in step I-(1) is performed. The steps I-(2) and I-(3) can be therefore omitted because no enlarged image is used. However, since the entire image of the chart is displayed, the first marks are displayed in small sizes. The operator may decide whether to use an enlarged image or not on its preference.

Description will be made of the case where the first mark extraction process is automatically performed by the extracting section 4. At first, the external portion of the first mark excluding the second mark is registered as a template. The external portion of the first mark processed first in the first mark extraction process may be registered as a template image. Then, the other first marks can be automatically measured by template matching. Also, the correlating of the first marks can be performed with ease since the positions of the first marks are apparent on the image. For example, when the first marks are arranged as shown in FIG. 10 and FIG. 11, it is easy to correlate each first mark based on the detected coordinates thereof. The template matching is the same as the target recognizing process (S662) in measurement of precise positions of the second marks described later and thus is not described here.

Description will be made of the case where the first mark extraction process is performed more automatically by the extracting section 4. A template image of the first mark for use in the first mark extraction process is registered in the extracting section 4 in advance. Then, the first marks are individually extracted by template matching using the template image of the first mark. Thus, the work of designating the first mark in step I-(1) can be omitted. Namely, when the first marks are apparently different from the second marks, the process can be automated by registering a temporal template image in the extracting section 4.

Then, the approximate mark position calculating section 5 measures and correlates the positions of the second marks (S650). This step include a step of obtaining external orientation elements (II-1) and step of calculating the approximate positions of the second marks (II-2). The term second mark means, as described above, the precise alignment reference mark 74 for wide-angle or the precise alignment reference mark 77 for zooming.

(II-1): Step of Obtaining External Orientation Elements

The approximate mark position measuring section 5 substitutes the image coordinates of the first marks obtained in step S640 and the reference point coordinates corresponding thereto into the second-order equations (1) (2) for projection conversion to set up an observation equation for obtaining parameters b1 to b8:

$$X=(b1 \cdot x+b2 \cdot y+b3)/(b7 \cdot x+b8 \cdot y+1) \tag{1}$$

$$Y=(b4 \cdot x+b5 \cdot y+b6)/(b7 \cdot x+b8 \cdot y+1) \tag{2}$$

wherein X and Y show reference point coordinates, and x and y show image coordinates.

Figure 16A:
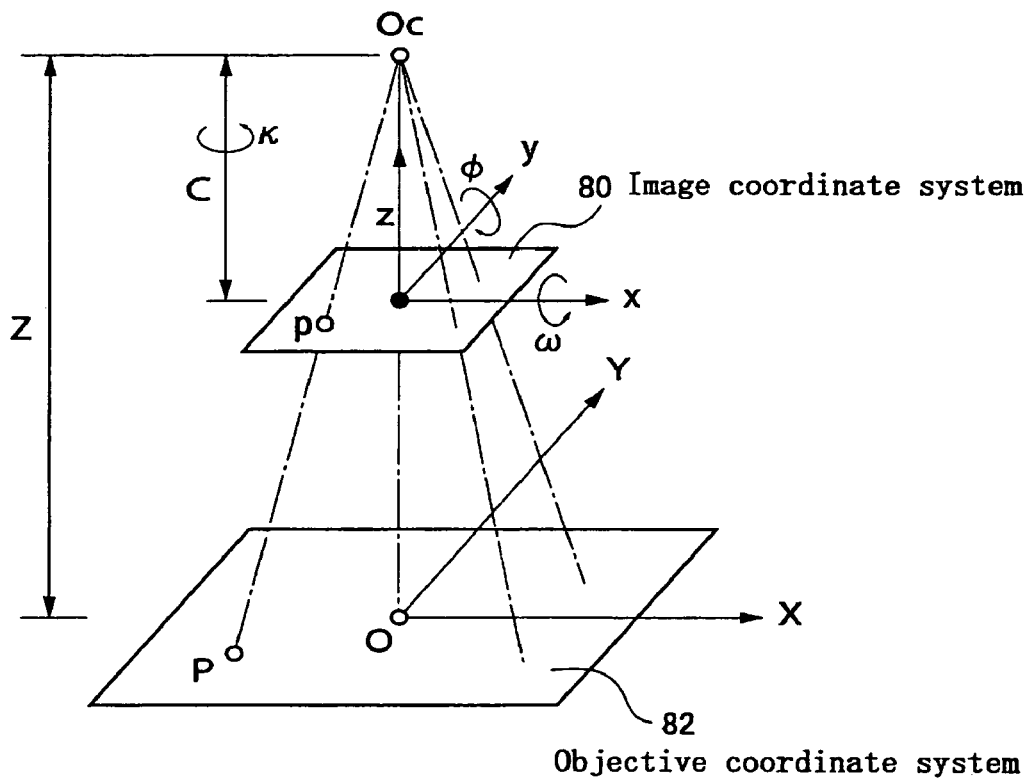
FIG. 16A is an explanatory view of an image coordinate system and an objective coordinate system in center projection and FIG. 16B is an explanatory view of a template image for normalized correlation and an object image for use in the target recognition.

Next, referring to FIG. 16, the relation between the reference point coordinates and the image coordinates are described. FIG. 16(A) is an explanatory view of an image coordinate system and an objective coordinate system in center projection. In center projection, a objective coordinate system 82 as a reference point coordinate system on which the three-dimensional field 70 for calibration is located and an image coordinate system 80 on which the film in the photographic lens section 10 or a CCD is located are in the positional relation as shown in FIG. 16(A) with respect to the project center Oc. Here, (X, Y, Z) is the coordinates of an object such as a reference mark on the objective coordinate system 82, (X0, Y0, Z0) are the coordinates of the projection center Oc, (x, y) are the coordinates of a point on the image coordinate system 80, C is the screen distance from the projection center Oc to the image coordinate system 80, and ω, φ and κ are the inclinations of the image coordinate system 80 in photographing with respect to the three axes X, Y and Z, respectively, forming the objective coordinate system 82 and referred to as external orientation element.

Then, following external orientation elements are obtained from the equation (3) with the use of the parameters b1 to b8 in the expressions (1) and (2).

$\omega = \tan^{-1}(C \cdot b8)$ $\phi = \tan^{-1}(-C \cdot b7 \cdot \cos\omega)$ $\kappa = \tan^{-1}(-b4/b1)$ ($\phi=0$)

$\kappa = \tan^{-1}(-b2/b5)$ ($\phi \neq 0$, $\omega=0$)

$\kappa = \tan^{-1}\{-(A1 \cdot A3 \cdot A2 \cdot A4)/(A1 \cdot A2 \cdot A3 \cdot A4)\}$ ($\phi \neq 0$, $\omega \neq 0$)

$Z0 = C \cdot \cos\omega \cdot \{(A22+A32)/(A12+A42)\}^{1/2} + Zm$ $X0 = b3 - (\tan\omega \cdot \sin\kappa/\cos\phi - \tan\phi \cdot \cos\kappa) \times (Zm-Z0)$ $Y0 = b6 - (\tan\omega \cdot \sin\kappa/\cos\phi - \tan\phi \cdot \cos\kappa) \times (Zm-Z0)$ (3)

where $A1=1+\tan^2\phi$, $A2=B1+B2 \cdot \tan\phi/\sin\omega$, $A3=B4+B5 \cdot \tan\phi/\sin\omega$, $A4=\tan\phi/(\cos\phi \cdot \tan\omega)$. Zm is the average of the heights of the first marks. For example, when the rough alignment reference marks 73 for wide-angle are used, Zm is the average of seven points shown in FIG. 2. When the rough alignment reference marks 76 for zooming are used, Zm is the average of seven points shown in FIG. 10. C is the focal length and corresponds to the screen distance as described before.

(II-2): Step of Calculating Approximate Position of Second Marks

A camera coordinate (xp, yp, zp) on an inclined camera coordinate system represented by the image coordinate system 80 corresponding to the coordinates (X, Y, Z) of an object on the ground represented by the objective coordinate system 82 are given by the equation (4) based on the principle of single photograph orientation:

where X0, Y0 and Z0 are defined as a ground coordinate of the projection center Oc as described above and shown in FIG. 16(A).

where the inclinations (ω, φ, κ) of the camera obtained from the expression (3) are substituted in the expression (4) to calculate a rotary matrix for obtaining elements a11 to a33 thereof.

Then, the obtained elements a11-a33 of the rotary matrix, the position (X0, Y0, Z0) of the camera obtained from the expression (3), and the reference point coordinate (X, Y, Z) of the target are substituted in the collinear condition expression (5) to obtain the image coordinate (x, y) of the target. The collinear expression (5) is a relation equation which is realized when there exist the projection center, the photographed image, and the object on the ground in alignment. This allows to obtain an approximate image coordinate of the target in the image taken with the actual photographic lens section 10 having its lens aberration since the position of the second mark is calculated on the assumption that no lens aberration exists.

$x = -C \cdot \{a11(X-X0)+a12(X-X0)+a13(Z-Z0)\}/\{a31(X-X0)+a32(X-X0)+a33(Z-Z0)\}$ $y = -C \cdot \{a21(X-X0)+a22(X-X0)+a23(Z-Z0)\}/\{a31(X-X0)+a32(X-X0)+a33(Z-Z0)\}$ (5)

In the calculation of $\tan^{-1}$ in the equations (3), two solutions are obtained. Thus, each of the inclinations (ω, φ, κ) has two solutions. Here, all the solutions are calculated and correct ω, φ and κ are calculated by comparing the residuals between the image coordinates of the first marks measured in the first mark extraction process and the image coordinates of the corresponding points obtained using the equations (5).

Although second order equations for projection conversion are used, the invention is not limited thereto. Other equations for projection conversion such as third order equations for projection may be used. The approximate mark position measuring section 5 correlates the second marks by assigning the management numbers of the second marks attached to a reference point file stored in the mark coordinate storing section 7a or the like to the target (second mark) of each of the first marks.

Figure 15:
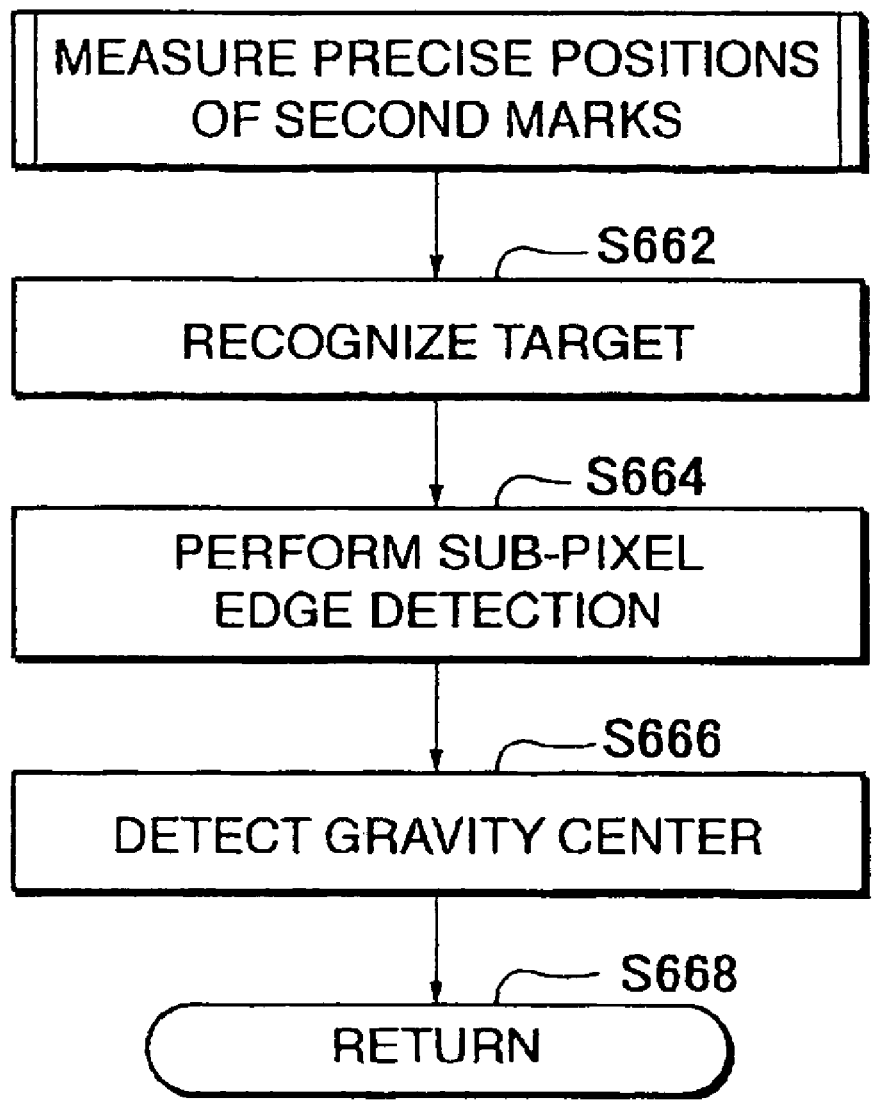
FIG. 15 is a flow chart, illustrating precise position measuring of second marks in step S660.

Description will be made with reference again to FIG. 14. The precise mark position measuring section 6 measures the precise positions of the second marks (S660). The procedure for measuring the precise positions of the second marks will be described in detail with reference to FIG. 15. The precise mark position measuring section 6 recognizes the targets as second marks (S662). Template matching using normalized correlation, for example, is used for the target recognition. The targets recognition will be described in detail.

(III) Target Recognition

Figure 16B:
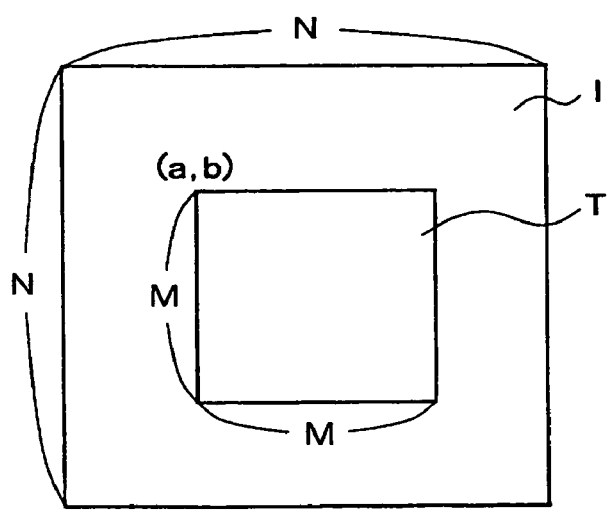

FIG. 16(B) is an explanatory view of a template image for normalized correlation and an object image for use in the $$\begin{pmatrix} x_p \\ y_p \\ z_p \end{pmatrix} = \begin{pmatrix} 1 & 0 & 0 \\ 0 & \cos\omega & -\sin\omega \\ 0 & \sin\omega & \cos\omega \end{pmatrix} \begin{pmatrix} \cos\phi & 0 & \sin\phi \\ 0 & 1 & 0 \\ -\sin\phi & 0 & \cos\phi \end{pmatrix} \begin{pmatrix} \cos\kappa & -\sin\kappa & 0 \\ \sin\kappa & \cos\kappa & 0 \\ 0 & 0 & 1 \end{pmatrix} \begin{pmatrix} X - X_0 \\ Y - Y_0 \\ Z - Z_0 \end{pmatrix}$$

$$= \begin{pmatrix} a_{11} & a_{12} & a_{13} \\ a_{21} & a_{22} & a_{23} \\ a_{31} & a_{32} & a_{33} \end{pmatrix} \begin{pmatrix} X - X_0 \\ Y - Y_0 \\ Z - Z_0 \end{pmatrix}$$ (4)

target recognition. At first, an arbitrary target is selected among the gravity centers measured in the first mark extracting step (S640). The template image for normalized correlation is an M×M pixel image centered around the gravity center (image coordinates) of the selected target. The object image is an N×N pixel image centered around the approximate position Σ(image coordinates) of the target calculated in the step of measuring the approximate positions of the second marks (S650).

Then, template matching according to the normalized correlation expressed by the equation (6) is performed on the object image and the point where the correlation value is maximum is obtained. Superposition is accomplished at the point where the correlation value is maximum and the target is regarded as being recognized at the point. The coordinates of the center of the template image are converted into image coordinates on a same-scale image, which are determined as a detecting point:

$$A = \{M^2 \times \Sigma(Xi \times Ti) - \Sigma Xi \times \Sigma Ti\} / [\{M^2 \times \Sigma Xi^2 - (\Sigma Xi)^2\} \times \{M^2 \times \Sigma Ti^2 - (\Sigma Ti)^2\}] \quad (6)$$

wherein A is a correlation value, M a square size of the template image, Xi an object image, and Ti an template image. Here, the square sizes N and M are variable. It is preferred for N and M to be as small as possible for the purpose of speeding up in processing, provided that the targets can be fully covered.

Figure 17:
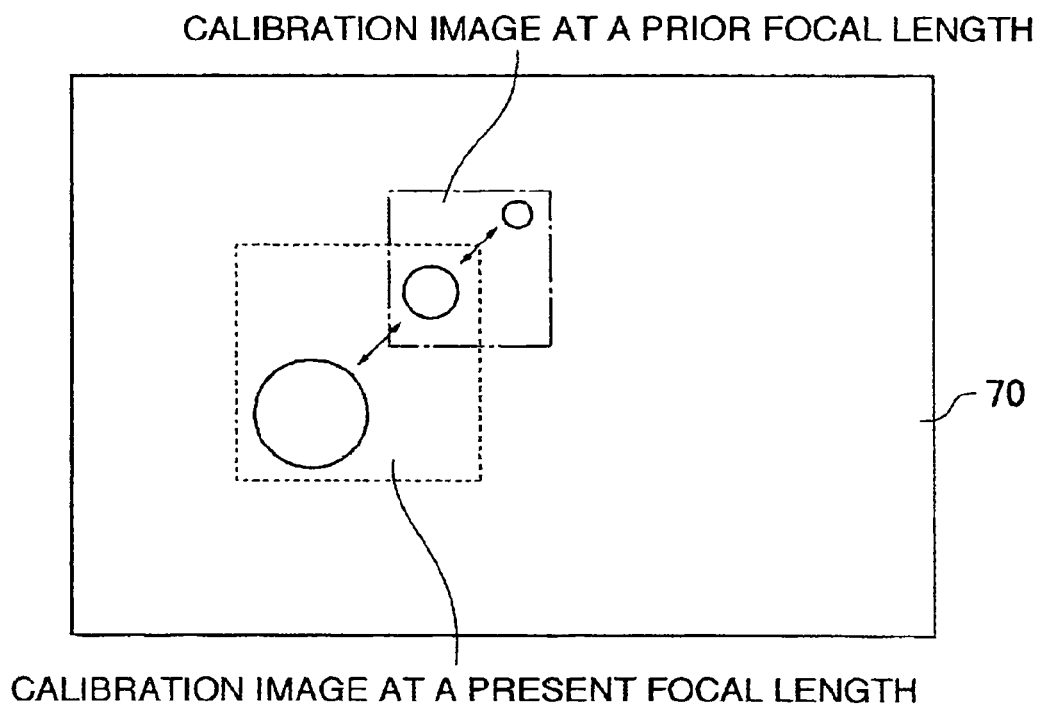
FIG. 17 is a view for illustrating the relation of coefficients used for the focal length and internal parameter function.

Now, referring to FIG. 17, the first mark extraction process and the approximate position calculating process for the second marks with the use of the reference mark inferring section 66 will be described in detail. FIG. 17 is a view, illustrating the relation between target recognition and the template images when the focal length of the photographic apparatus to be calibrated is adjusted, in which each photographed area of a calibration image at a prior focal length and a calibration image at a present focal length is shown in the three-dimensional field 70 for calibration. When the focal length of the photographic lens section 10 is changed in sequence, both the target position and target size of the calibration image at the present focal length can be inferred using the target position information of the calibration image at the prior focal length. Here, the term target means a rough alignment reference mark 73 for wide-angle as a first mark and a precise alignment reference mark 74 for wide-angle as a second mark, or a rough alignment reference mark 76 for zooming as a first mark and a precise alignment reference mark 77 for wide-angle as a second mark. In such constitution, for the first marks, the extracting section 4 extracts the coordinate values of the first marks, while for the second marks the approximate mark position measuring section 5 calculates the approximate positions of the second marks. During operation, the extraction of the target positions is accelerated by the reference mark inferring section 66.

The duplicate reference extracting section 67 extracts a group of the reference marks matched between the photographed reference marks for calibration in the first image-for-calibration as a calibration image at a prior focal length and the photographed reference marks for calibration in the second image-for-calibration as a calibration image at a present focal length. Then the additional reference mark position information extracting section 68 extracts, from the reference mark images in the second image-for-calibration, additional reference marks any reference marks corresponding to which do not lo exist in the first image-for-calibration, and reads the three-dimensional position information relating to the additional reference marks with reference to the reference mark position information database section 65.

Figures 18A, 18B:
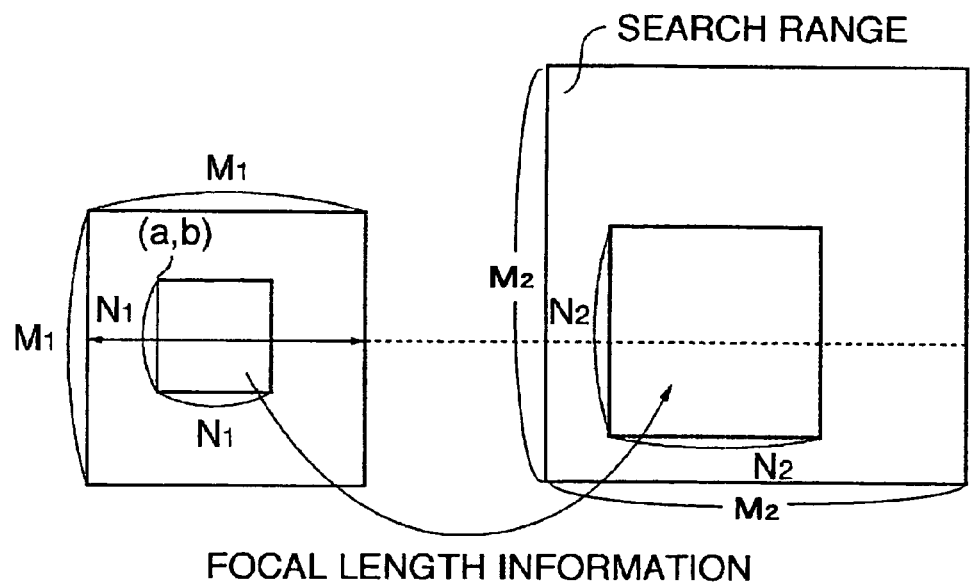
FIGS. 18(A) and 18(B) illustrates an example of extraction of a duplicate reference mark with the use of cross correlation coefficient method.

FIG. 18 illustrates an example of extraction of a duplicate reference mark 15 with the use of cross correlation coefficient method, FIG. 18A shows a calibration image at a prior focal length, and FIG. 18B a calibration image at a present focal length. The correlation coefficient method is performed according to the following procedures using expressions as follows:

$$C(a, b) = \sum_{m_1=0}^{N_1-1} \sum_{n_1=0}^{N_1-1} \frac{\{I_{(a,b)}(m_1, n_1) - \bar{I}\}\{T(m_1, n_1) - \bar{T}\}}{\sqrt{I_{\sigma_{ab}} T_\sigma}} \quad (7)$$

$$\bar{I} = \frac{1}{N_1^2} \sum_{m_1=0}^{N_1-1} \sum_{n_1=0}^{N_1-1} I_{(a,b)}(m_1, n_1) \quad (8)$$

$$\bar{T} = \frac{1}{N_1^2} \sum_{m_1=0}^{N_1-1} \sum_{n_1=0}^{N_1-1} T(m_1, n_1) \quad (9)$$

$$I_{\sigma_{ab}} = \frac{1}{N_1^2} \sum_{m_1=0}^{N_1-1} \sum_{n_1=0}^{N_1-1} \{I_{(a,b)}(m_1, n_1) - \bar{I}\}^2 \quad (10)$$

$$T_\sigma = \frac{1}{N_1^2} \sum_{m_1=0}^{N_1-1} \sum_{n_1=0}^{N_1-1} \{T(m_1, n_1) - \bar{T}\}^2 \quad (11)$$

$I_{(a,b)}(m_1, n_1)$: Part of input image $T(m_1, n_1)$: Template image (III-1): For example, an N1×N1 pixel image centered around the point of a reference mark extract ed by the duplicate reference mark extracting section 67 is carved as a template image from the calibration image at a prior focal length. The template image is converted into an N2×N2 pixel image in view of the prior and present focal lengths. FIG. 18(B) shows an example of a carved template image and a converted template image thereof.

(III-2): M2×M2 pixels larger than the template image and included in the calibration image at the present focal length are defined as a search range $(M2-N2+1)^2$ and then the template image is moved within the search range.

(III-3): The search is presumed to be completed relative to the template image at the time when an image position where the cross correlation coefficient C (a, b) in the above expression reaches maximum value is obtained. If the calibration image at the prior focal length matches completely the calibration image at the present focal length, the cross correlation coefficient C (a, b) equals 1.0.

(III-4): If any reference marks that were not projected in the calibration image at the prior focal length exist in the calibration image at the present focal length, then the additional reference mark position information extracting section 68 performs subsequent process.

Description will be made with reference again to FIG. 15. Sub-pixel edge detection is performed on the second marks (S664) to precisely measure the position of the second marks. The object image on which the sub-pixel edge detection of the second marks is performed is an N×N pixel image centered around the detection point recognized as a target in step S662. Laplacian-Gaussian filter (LOG filter) as a quadratic differential of a Gauss function expressed by the equation (7) is applied to the light & shade waveform in the object image and the two zero crossing points on a curve as a result of calculation, namely the edges, will be detected with sub-pixel accu racy. To detect with sub-pixel accuracy means to perform position detection with higher accuracy than one pixel.

$$\nabla^2 \cdot G(x) = \{(X^2 - 2\sigma^2)/2\pi\sigma^6\} \cdot \exp(-x^2/2\sigma^2) \quad (12)$$

where σ is a parameter of the Gauss function.

Then, the gravity center of the target is detected (S666), and the process is returned (S668). Here, the position where the edges obtained using the equation (12) in the x and y directions cross each other is determined as the position of the gravity center of the target. The measurement of the precise positions of the second marks is not necessarily performed by the process comprising steps S662 to S666. The precise positions of the second marks may be obtained by another gravity center position detection method such as a moment method or a modified template matching method.

Description will be made with reference again to FIG. 14. It is confirmed that there is no apparent error in the positions of the gravity centers of all the targets (S670). Namely, it is judged whether the position detection of the recognized targets was appropriate. For the convenience of the operator, the positions of the detected targets are displayed on the display section 9. When there is no error, the process goes to step S690. When there is an error, inappropriate target positions are corrected (S680). Targets the correlation values of which was calculated in step S662 are low or targets the detected gravity center positions of which are too far apart from their approximate positions are displayed on the display section 9 in such a manner that the operator can easily recognize, in red, for example. The operator manually re-measures the positions of such targets (designates the gravity center positions thereof with the mouse). The erroneous target positions do not necessarily have to be corrected here. They can be removed since they are detected as abnormal points in the process for obtaining calibration parameters in step S700.

The process comprising steps S630 to S680 are performed on for all the images necessary for the measurement of the lens aberration (S690). For example, when five images were photographed, the process may be performed on the five images. When sufficient number of images for the measurement of the lens aberration has been processed, the other photographed images may not be necessarily processed.

When a sufficient number of images for the measurement of the lens aberration have been processed, a process for obtaining calibration correction coefficient for the lens aberration using the process for calculating the internal parameter performed in the calculating section 7 is performed (S700). The calculation of calibration correction coefficient is performed on all the second marks which are present in the three-dimensional field 70 for calibration and have been correlated and whose gravity centers have been obtained by the processes in the approximate mark position measuring section 5 and the precise mark position measuring section 6.

(IV) Calculation of Internal Parameters of a Camera ( a Bundle Adjustment Method Accompanying Self Calibration)

To calculate the internal parameters of a camera in the calculating section 7, "a bundle adjustment method accompanying self calibration" which has been utilized in the field of photogrammetry can be used. The term "bundle adjustment" used herein is a method comprised of: setting up an observation equation for each bundle of light based on a collinear condition that a bundle of light passing an object to be taken, a lens, and a CCD surface must be on a line; and, with the use of least squares adjusting the inclination and position (external orientation elements) of the camera and the position coordinate of the second mark at once. Also, "self calibration" means a method for obtaining internal stereotactic values (lens aberration, principal point and focal length) of the camera. Specifically, basic equations with the collinear condition for a bundle adjustment method accompanying self calibration (hereinafter simply referred to as "bundle adjustment method") are Equation (13) and Equation (14) as follows:

$$x = -c \frac{a_{11}(X - X_0) + a_{12}(Y - Y_0) + a_{13}(Z - Z_0)}{a_{31}(X - X_0) + a_{32}(Y - Y_0) + a_{33}(Z - Z_0)} + \Delta x \quad (13)$$

$$y = -c \frac{a_{21}(X - X_0) + a_{22}(Y - Y_0) + a_{23}(Z - Z_0)}{a_{31}(X - X_0) + a_{32}(Y - Y_0) + a_{33}(Z - Z_0)} + \Delta y \quad (14)$$

The basic equation of Equation (13) and Equation (14) is the collinear conditional equation (5) for the single photograph orientation which was described in the first mark extraction process. In other words, the bundle adjustment method is a technique for calculating a variety of solutions by approximation using the least squares method, enabling to obtain at once external orientation elements of the camera placed in each photographic position, that is, enabling to obtain calibration correction coefficients of the camera.

Now, in the following equation (15) is shown an example of an internal streotactic correction model (lens aberration) having a lens distortion in the irradiation direction.

$$\begin{cases} \Delta x = x_0 + x(k_1 r^2 + k_2 r^4) \\ \Delta y = y_0 + y(k_1 r^2 + k_2 r^4) \\ r^2 = (x^2 + y^2)/c^2 \end{cases} \quad (15)$$

$k_1, k_2$: Lens distortion in the radial direction

The correction model is not limited to the above one. Any correction model suitable for the lens may be selected. The calculation can be made by a successive approximation method when there are at least six reference points on the ground coordinate system and the image coordinate system. The calculating section 7 has a threshold value of the successive approximation method and removes the second marks on the three-dimensional-field 70 for calibration whose error is not smaller than the threshold value to obtain precise calibration correction coefficient. Thus, the second marks which were not detected as erroneous marks in the step of confirming the gravity centers of the targets (S70) can be detected and removed in step S700.

Description will be made with reference again to FIG. 14. The result of calculation for obtaining the calibration correction coefficients by the calculating section 7 is judged (S710). When the calculation did not converge or the obtained calibration correction coefficient seems to be inappropriate, the problems are solved in step S720. In step S720, images including erroneous second marks are selected. Since it has become apparent which second marks of which images have error by the calculating section 7 upon completion of the calibration in step S700, the detecting points of the targets in each of the images are displayed for confirmation.

The operator manually corrects the erroneous second marks (S730). Namely, since the coordinates of the gravity center of the erroneous second marks are shifted, the correction is made by moving the mark displayed as erroneous second marks to the gravity center position indicated as being appropriate. Then, it is judged whether the correction of the positions of the erroneous second marks has been completed (S740). When the correction has been completed, the process returns to the step of calculating the calibration correction coefficient in step S700, and the calibration correction coefficient is calculated again. If there are other second marks to be corrected, the process returns to step S720 and the operation for correcting the positions of erroneous second marks is repeated.

When the result of operation for obtaining the calibration correction coefficient is appropriate, it is judged whether or not there exists any other group of calibration images which have an other focal length (S750). If exists, the process returns to S630. When the result of operation for obtaining the calibration correction coefficient is appropriate for a group of images of every focal length, those results are displayed in the display section 9 (S760).

Figure 19:
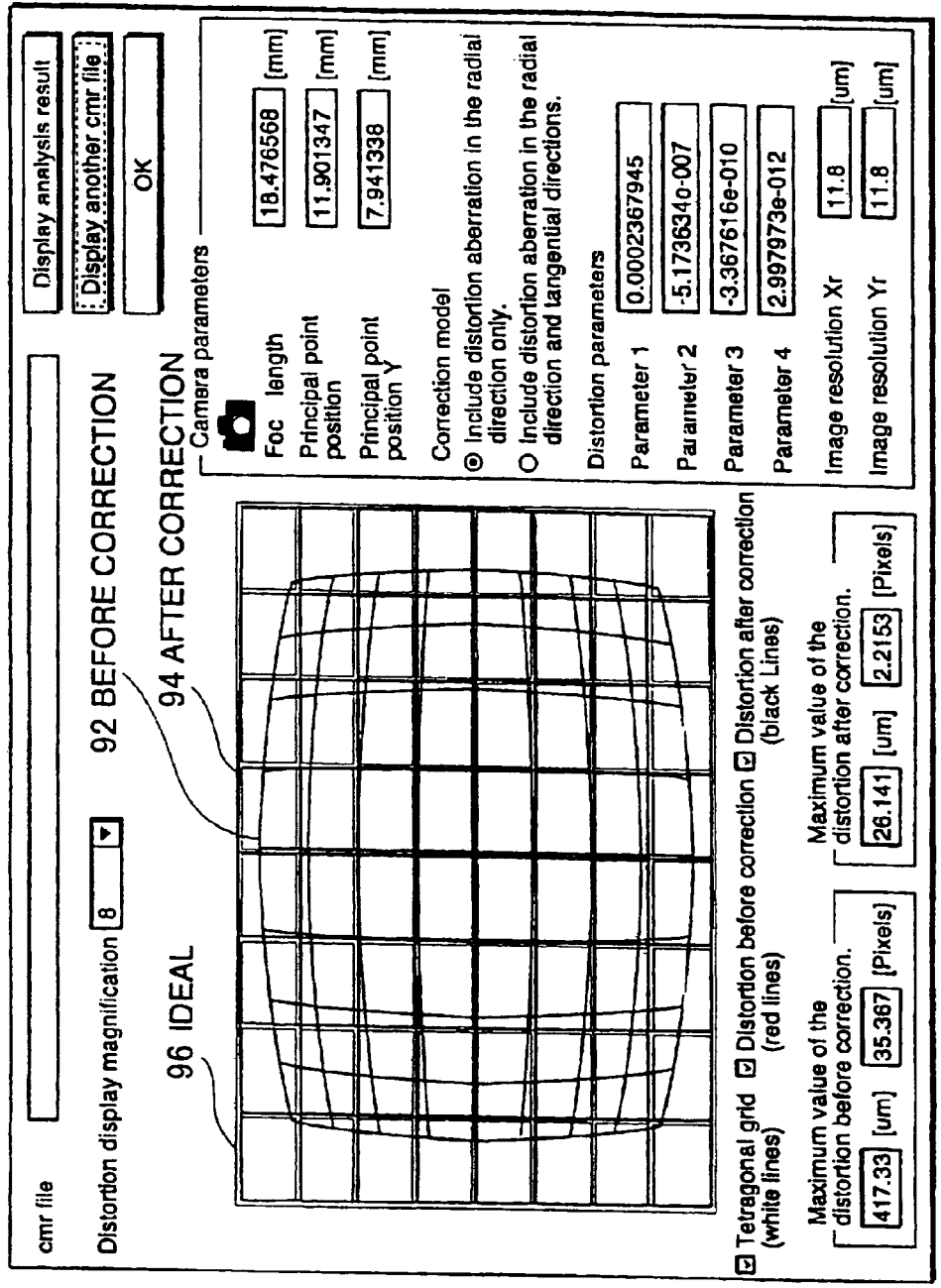
FIG. 19 is a view, illustrating the relation between target recognition and the template images when the focal length of the photographic device-to-be-calibrated is adjusted

FIG. 19 is an explanatory view, showing an example of the result of the operation for obtaining the calibration correction coefficient. For example, the focal length, principle point position and distortion parameters as the calibration correction coefficient are displayed on the display section 9. As for distortion representing the lens aberration, curves 92 before correction, curves 94 after correction, and ideally corrected curves 96 may be displayed in graphical form for easy understanding.

Figure 20:
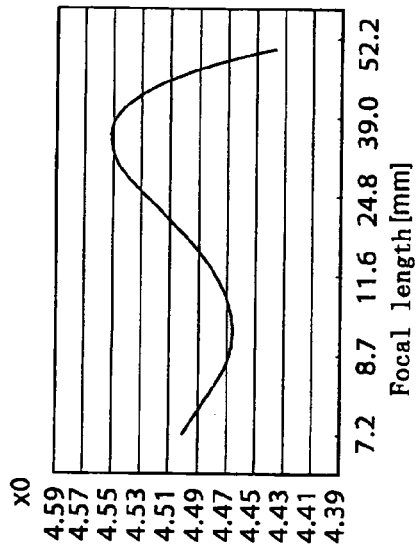
FIGS. 20(A)-20(D) are explanatory views, showing an example of a result of calculating a calibration correction coefficient.
Figure 20:
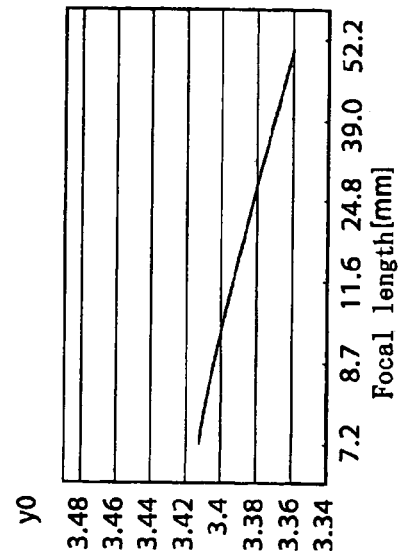
Figure 20C:
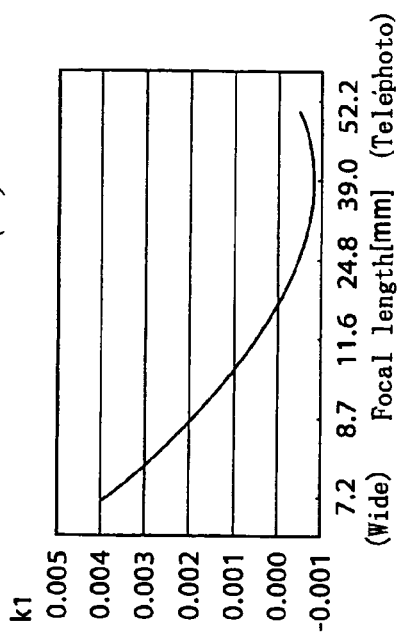
Figure 20:
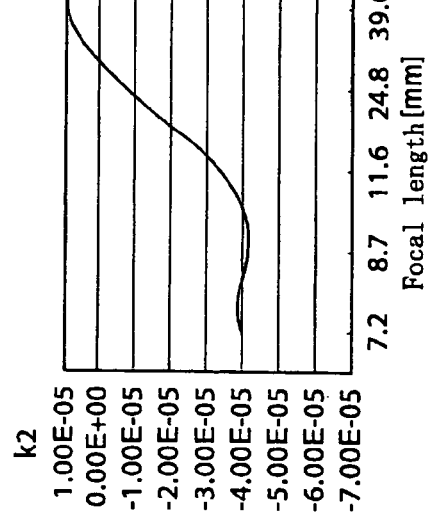

Now, referring to FIG. 20, the calibration correction coefficient function is described using the internal parameters calculated at the operation processing section 7, where the focal length is a variable. FIG. 20 is a view, showing the relation between the focal length and the coefficients for use in the internal parameter function, in which FIG. 20(A) shows the coefficient $k_1$ of the expression (15), FIG. 20(B) the coefficient $k_2$ of the expression (15), FIG. 20(C) x-axis position displacement coefficient $x_0$ of the camera principal point and the image center in the image coordinate system x, and FIG. 20(D) y-axis position displacement coefficient $y_0$ of the camera principal point and the image center in the image coordinate system y. Here, the focal length of the photographic lens section 10 is assumed to be adjustable from 7.2 mm to 50.8 mm. When the measurement number of the focal length data is six, a maximum wide angle is obtained at the focal length of 7.2 mm and a maximum zoom at 52.2 mm. The other focal lengths are selected as intermediate measuring points of 8.7 mm, 11.6 mm, 24.8 mm and 39.0 mm which are optically equal intervals.

In the equation (15), the absolute values of the coefficients k1 and $k_2$ are maximum on the maximum wide angle side, while those are small on the maximum zoom side. Since the x-axis position displacement coefficient xo between the camera principal point and the image center varies complicatedly, such as, the minimal value 4.47 at the focal length of the photographic lens section 10 of 8.76 mm; the minimum value 4.44 at that of 52.2 mm; and the maximum value 4.55 at that of 24.8 mm, it is approximated with a curve of the fifth order of the focal length. The y-axis position displacement coefficient $y_0$ of the camera principal point and the image center in the image coordinate system y changes monotonously according to the focal length of the photographic lens section 10. Since the photographed image of the chart is taken in focus, the focal length f of the photographic lens section 10 and the screen distance C from the projection center Oc to the image coordinate system 80 are equal.

The operation processing section 7 may be configured such that, when the focal length f is inputted, the coefficients $k_1$, $k_2$, $x_0$ and $y_0$ can be obtained for the internal parameter functions. Those coefficients are substituted into the expressions (13), (14) and (15) as the internal parameter functions and a observation expression is established for each observation point. Then the observation expressions are simultaneously solved and the least squares method is applied to calculate the most provable internal parameters.

[Successive orientation]

Figure 21:
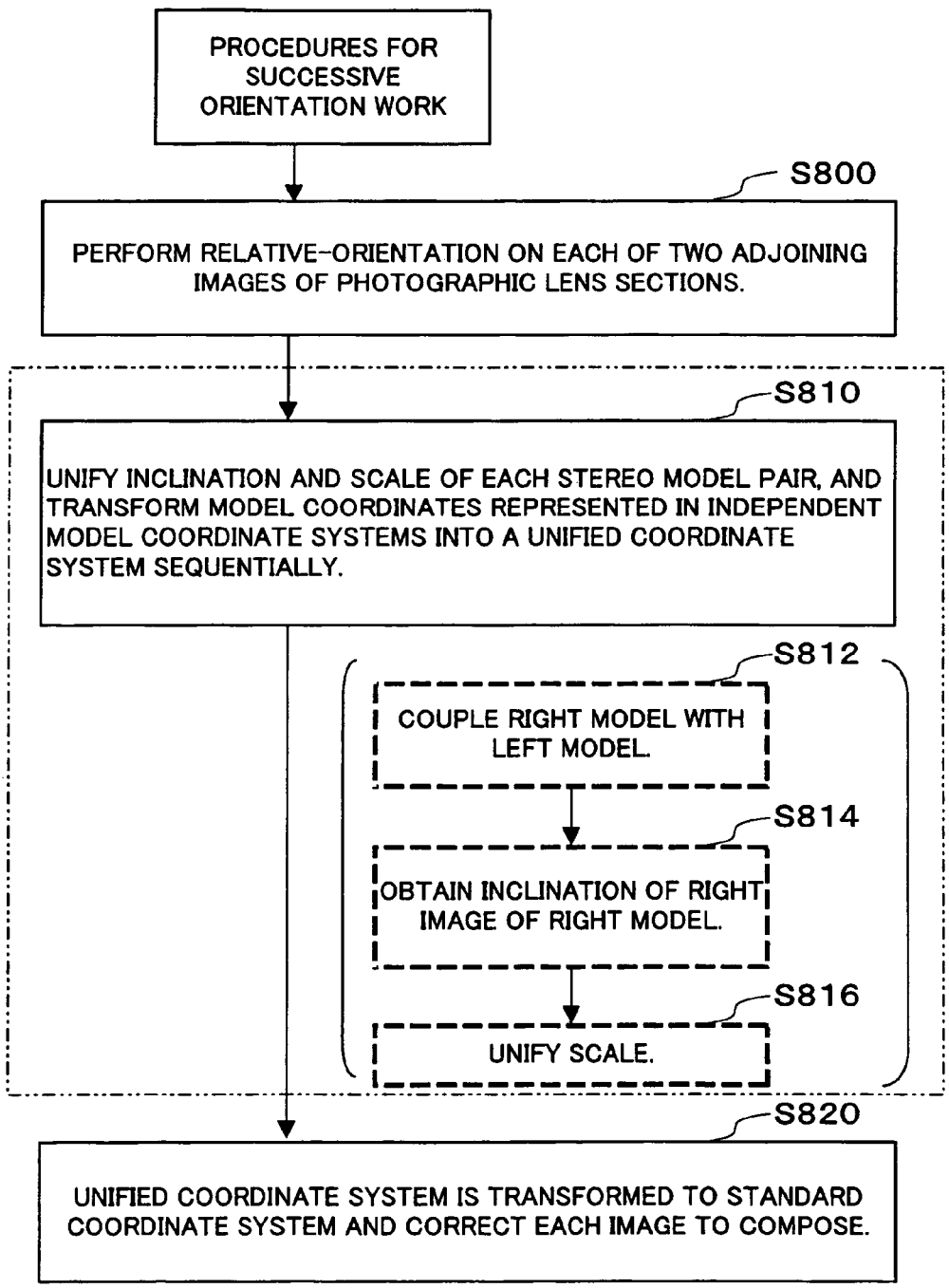
FIG. 21 is a flow chart for the description of the procedure for successive orientation works required to form the panoramic image.
Figure 22:
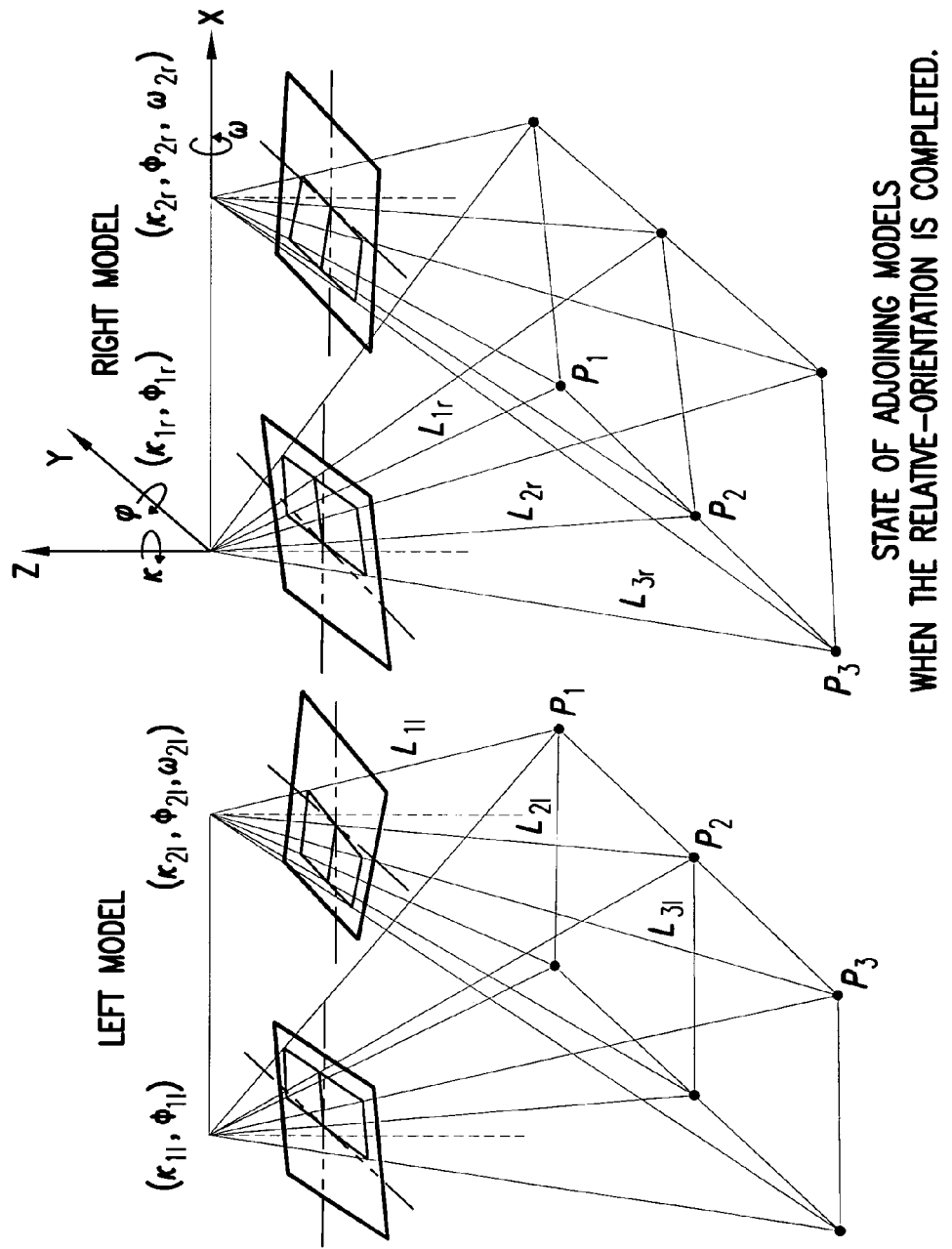
FIG. 22 is an explanatory view of the state in which the relative-orientation for the adjoining two models is completed.

Subsequently, the successive orientation required for the panoramic image forming section 52 in Example 2 and Example 3 to form a panoramic image is described. FIG. 21 is a flow chart for the description of the procedures for successive orientation work required to form the panoramic image. First, relative-orientation is performed on the two adjoining images of each photographic lens section respectively (S800). FIG. 22 is an explanatory view of the state in which the relative-orientations for the adjoining two models are completed. Upon completion of the relative-orientations, the inclination of the left image of a right model is defined as $\phi_{1r}$ and $\kappa_{1r}$ and the inclination of the right image of the right model as $\omega_{2r}$, $\phi_{2r}$ and $K_{2r}$. Also, the inclination of the left image of a left model as $\phi_{1l}$ and $\kappa_{1l}$ and the inclination of the right image of the left model as $\omega_{2l}$, $\phi_{2l}$ and $\kappa_{2l}$. Here, the term "relative-orientation" means a successive orientation between two images.

Figure 23:
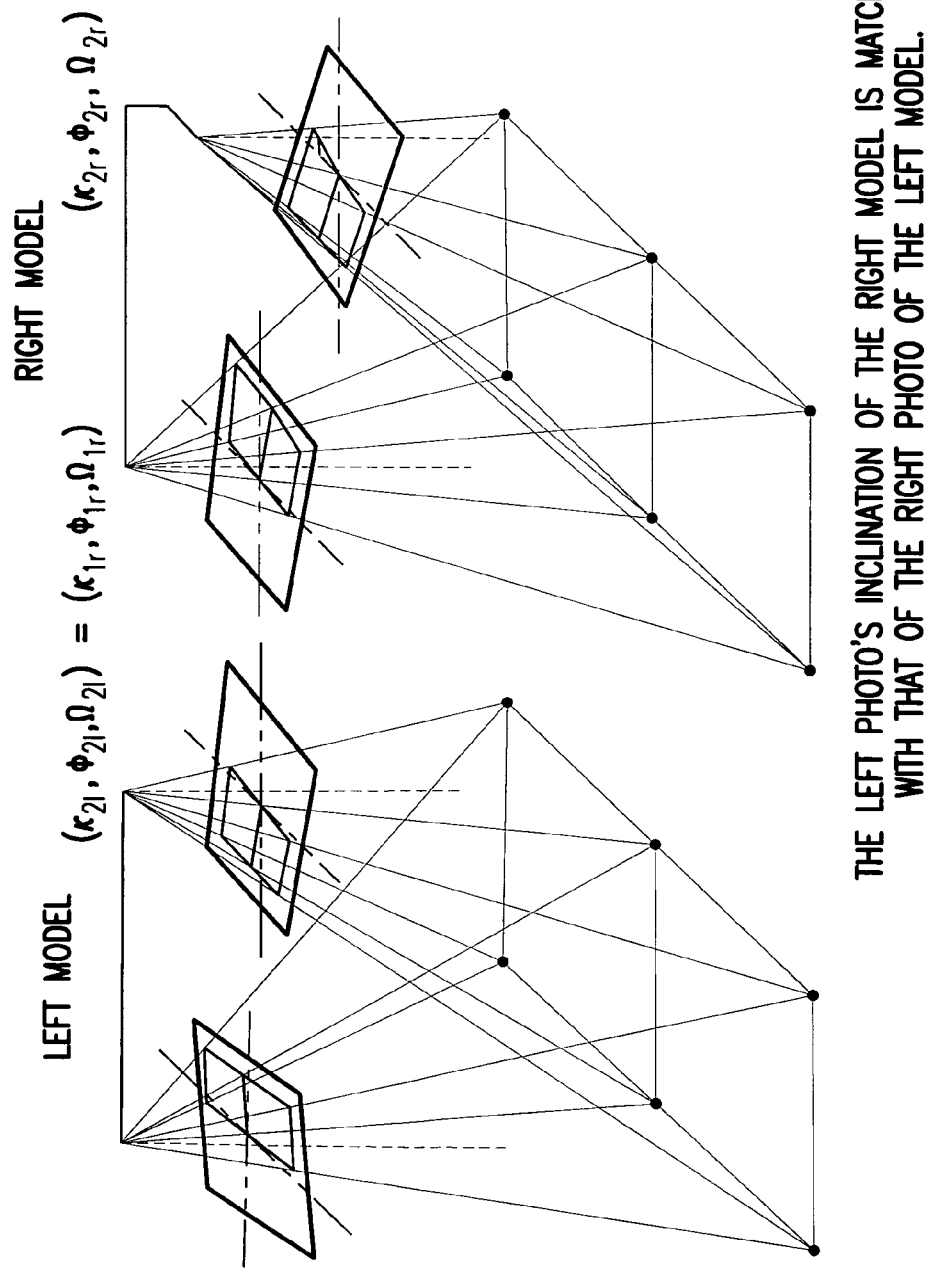
FIG. 23 is an explanatory view of the state in which the inclination of the left image of the right model is matched with that of the right image of the left model.

Then, the scale and the inclination of each stereo model pair are unified and both model coordinates represented with different coordinate systems each other are sequentially transformed into a common coordinates (S810). FIG. 23 is an explanatory view of the state in which the inclination of the left image of the right model is matched with that of the right image of the left model. That is, while the coordinate system of the left camera is fixed, the inclination of the right image and the deviation of the projection center are taken into the orientation element. After that, the inclination of the left image of the right model is matched with that of the right image of the left model, the scale is unified, and then the projection center is moved in parallel (Refer to the right model shown in FIG. 23). By repeating this operation, the coordinates can be unified. The procedures for the step S810 are described in more detail.

Initially, the right model is coupled to the left model (S812). Specifically, the right model is entirely rotated so that the inclination of the left image of the right model to be jointed is matched with that of the right image of the left model (Refer to FIG. 23). When the model coordinate is defined as (X", Y", Z") at the completion of such operation, a following expression is derived:

$$\begin{pmatrix} X'' \\ Y'' \\ Z'' \end{pmatrix} = R(\Omega_{21}, \Phi_{21}, K_{21})R^t(\phi_{1r}, \kappa_{1r}) \begin{pmatrix} X \\ Y \\ Z \end{pmatrix} \quad (16)$$

where $\Omega_{2l}$, $\Phi_{2l}$ and $K_{2l}$ represent the inclination of the left image. From this expression, not only the model coordinate but also the projection center ($X_0$", $Y_0$", $Z_0$") for the new unified inclination is obtained in advance by substituting the projection center coordinate (1, 0, 0) of the right model. The coordinates of the projection center are used to calculate the scale coefficient and the length of parallel shift.

Next, the inclination of the right image of the right model (S814), which is used to couple a subsequent model. In other words, when the inclinations of three axes of the right image of the right model is defined as $K_{2r}$, $\Phi_{2r}$ and $\Omega_{2r}$ at the completion of joint operation, a rotary matrix is given by the following expression:

$$R(\Omega_{2r}, \Phi_{2r}, K_{2r}) = R(\Omega_{2l}, \Phi_{2l}, K_{2l})R^t(\phi_{1r}, \kappa_{1r})R(\omega_{2r}, \phi_{2r}, \kappa_{2r}) \quad (17)$$

Then the scale is unified (S816). In the relative-orientation, the base lo line length is generally a unit length, 1 (one).

Therefore, the scale of each model obtained by an independent relative-orientation is different from those of other models. Accordingly, a scale coefficient is calculated using common points of the adjoining models, and the values of the right model coordinate is multiplied by this scale coefficient to obtain a unified scale. The scale for the model coordinate (X", Y", Z") of the projection center for which the image inclination is unified is converted by the following expression:

$$\begin{pmatrix} X''' \\ Y''' \\ Z''' \end{pmatrix} = S \begin{pmatrix} X'' \\ Y'' \\ Z'' \end{pmatrix} \quad (18)$$

where S represents the scale coefficient.

Figure 24:
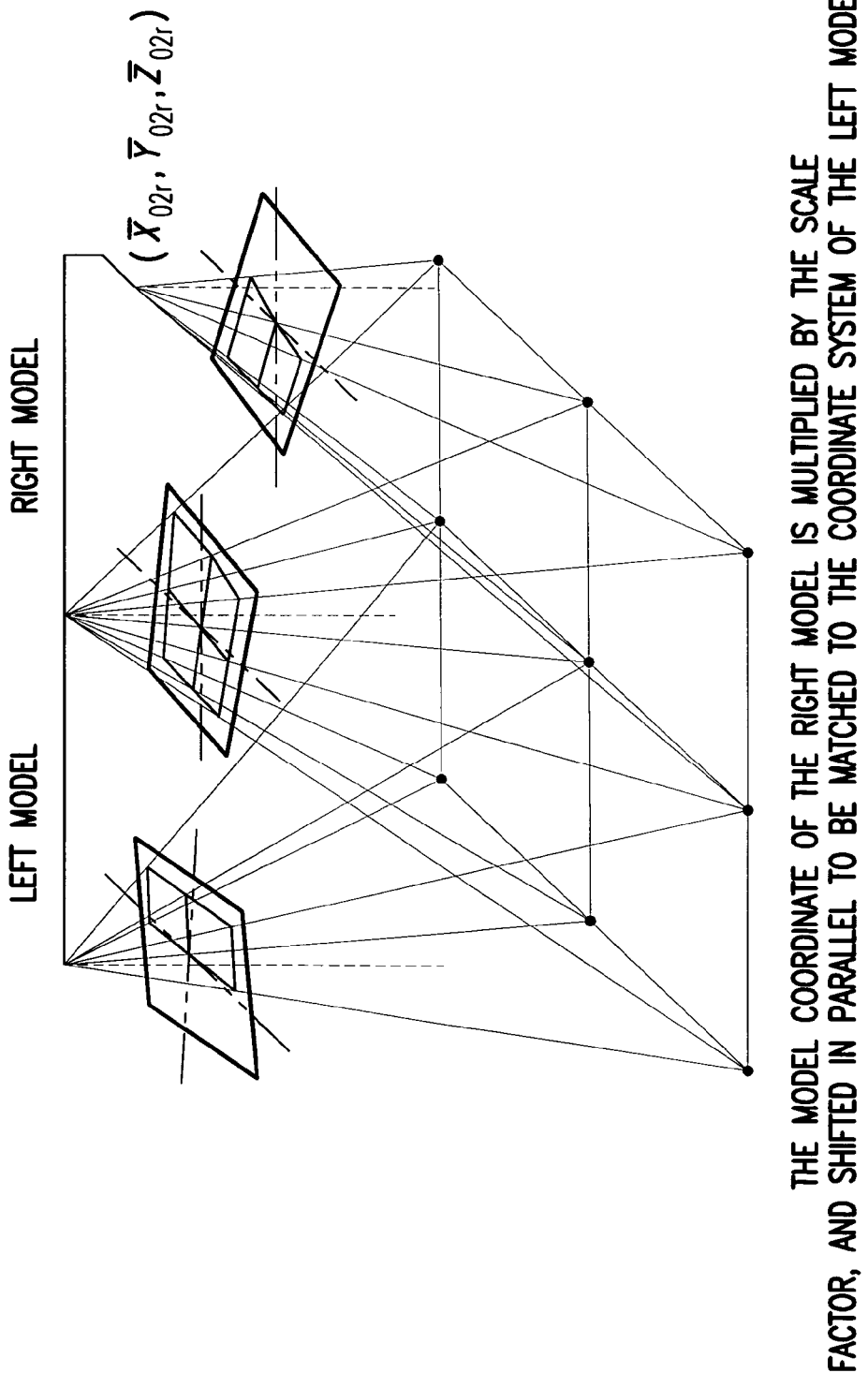
FIG. 24 is an explanatory view of the state in which the model coordinate of the right model is multiplexed by the scale reduction coefficient and is displaced in parallel to match the coordinate system with that of the left model.

Next, the unified coordinate system is transformed into a standard coordinate system and the image is corrected to be composed (S820). FIG. 24 is an explanatory view of the state in which the model coordinate of the right model is multiplied by the scale coefficient and is shifted in parallel to match the coordinate system with that of the left model. The unified coordinate system can be obtained by shifting in parallel the model coordinate having the unified inclination and reduction scale of the right model to be jointed, relating to the projection center coordinate of the right image of the left model, since the inclination and the scale have been unified (Refer to FIG. 24).

$$\begin{pmatrix} X'' \\ Y'' \\ Z'' \end{pmatrix} = \begin{pmatrix} X''' \\ Y''' \\ Z''' \end{pmatrix} + \begin{pmatrix} X_{021} \\ Y_{021} \\ Z_{021} \end{pmatrix} \quad (19)$$

where (X''', Y''', Z''') represents the unified model coordinate; (X02, Y02, Z02) the projection center coordinate of the right image of the left model. Also, a successive orientation processing required for panoramic image forming may be performed to unify the coordinate systems for obtaining a composite image with the use of the independent modeling method, the bundle adjusting method or the like besides the method described in FIG. 21 to FIG. 24.

Figure 25:
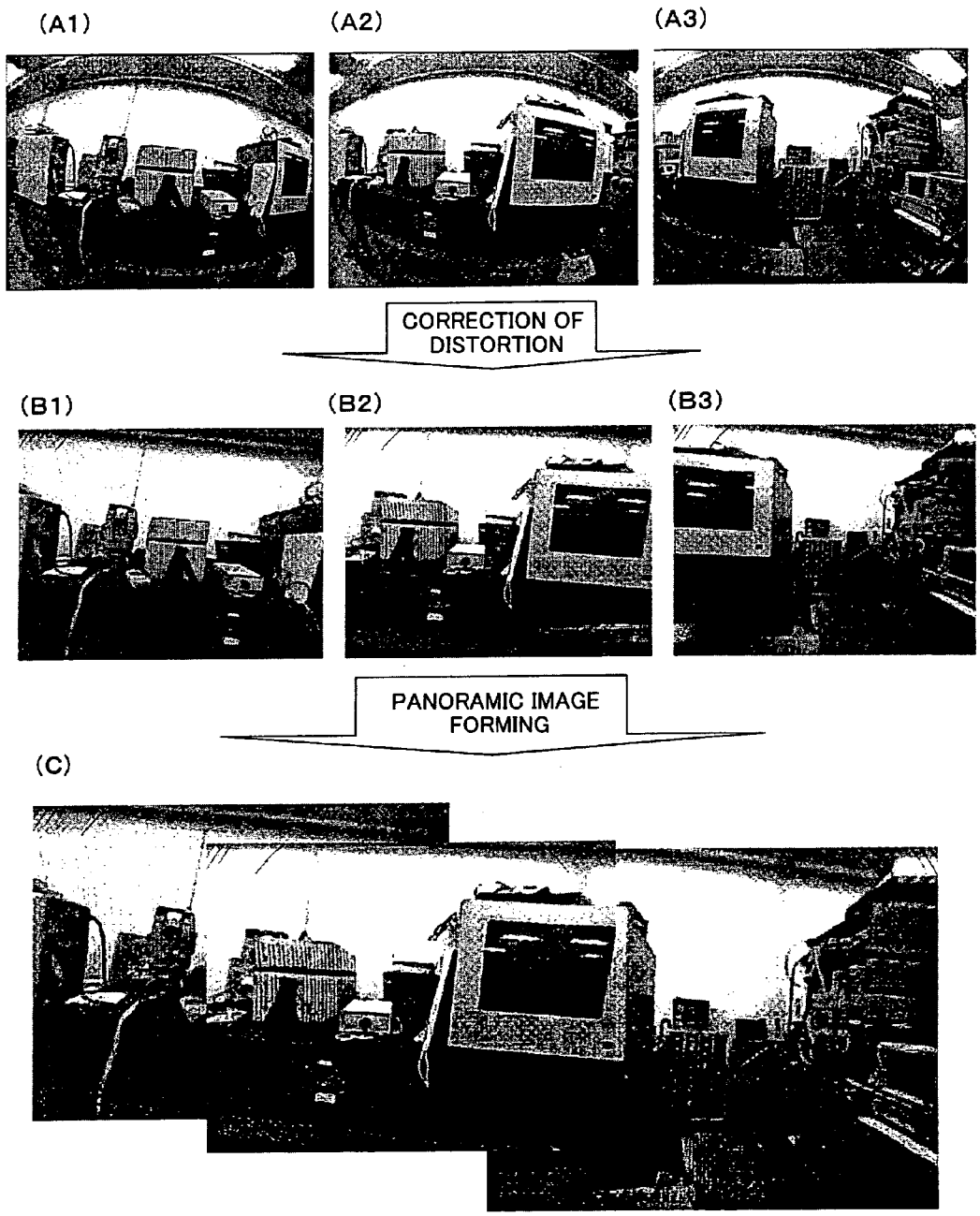
FIGS. 25 (A1)-(A3),(B1)-(B3) and (C) are views describing an example of processing to form a panoramic image by the use of the images taken by a wide-angle lens.

FIG. 25 is a view for describing an example of processing to form a panoramic image by the use of the images taken by a wide-angle lens, in which the FIG. 25(A) shows three adjoining images arranged side-by-side before image distortion correction; FIG. 25(B) the three adjoining images arranged side-by-side on which the image distortion was corrected; and FIG. 25(C) is a unified image through panoramic image forming. The images taken with a wide-angle lens have a wide field of view, but an object is smaller at its peripheral area, compared with its central portion since the image has a large lens distortion. By performing a image distortion correction process on the image taken with the wide-angle lens, the sizes of the taken image of the object become approximately the same over the central portion and the peripheral area thereof Also, by performing a panoramic image forming process, a smooth joint of the three images arranged side-by-side is allowed and as a result an united image having a wide field of view can be obtained.

DESCRIPTION OF REFERENCE NUMERAL 10, 110 photographic lens section
11, 111 zoom function section
12, 112 focal length data outputting section
20, 120 photographic parameter detecting section
30, 130 photoreceptor section
40 digital image information storing section
50 image correction section
52 panoramic image forming section
60 calibration parameter storing section
100 photographic apparatus
140 photographed image data forming section
150 photographed image data outputting section

What is claimed is:

1. A photographic apparatus comprising:
a photographic lens section with adjustable photographic parameter;
a photographic parameter detecting section for detecting the photographic parameter of said photographic lens section during photographing, wherein the photographic parameter is a focal length;
a photoreceptor section for receiving image information formed by said photographic lens section; and
an image correction section for receiving an image signal from said photoreceptor section, and for performing distortion correction of said image signal based on predetermined calibration parameters corresponding to the photographic parameter detected at said photographic parameter detecting section, wherein the predetermined calibration parameters include a lens distortion parameter and a principal position parameter,
wherein the lens distortion parameter is $k_1$ and $k_2$, the principal position parameter is $x_0$ and $y_0$, and
the calibration to x, a coordinate in x-axis, and y, a coordinate in y-axis in an image coordinate system, is done using following equations where c is a constant:

$\Delta x = x_0 + x(k_1 r^2 + k_2 r^4)$ $\Delta y = y_0 + y(k_1 r^2 + k_2 r^4)$ $r^2 = (x^2 + y^2)/c^2$.

2. The photographic apparatus according to claim 1, further comprising a calibration parameter storing section for storing the predetermined calibration parameters corresponding to the photographic parameter; and
wherein said image correction section extracts, from the calibration parameters stored in said calibration parameter storing section, the calibration parameters corresponding to said photographic parameter detected at said photographic parameter detecting section.

3. The photographic apparatus according to claim 1, wherein said photographic lens section has: a zoom function section which moves; and a focal length data outputting section for outputting the focal length data of said photographic lens section which changes in response to the zooming of said zoom function section;
wherein said calibration parameter storing section stores calibration data corresponding to the focal length, as said calibration parameter, of said photographic lens section, and
said image correction section performs distortion correction to said image signal based on said calibration data.

4. The photographic apparatus according to claim 2, wherein said photographic lens section has: a zoom function section which moves; and a focal length data outputting section for outputting the focal length data of said photographic lens section which changes in response to the zooming of said zoom function section;

wherein said calibration parameter storing section stores calibration data corresponding to the focal length, as said calibration parameter, of said photographic lens section, and said image correction section performs distortion correction to said image signal based on said calibration data.

5. The photographic apparatus according to claim 1, wherein said photographic lens section includes a lens having changeable inclination of an optical axis thereof or changeable position thereof;

said photographic parameter detecting section detects the position of the lens or the inclination of the optical axis as said photographic parameter; and said image correction section performs distortion correction of said image signal based on the predetermined calibration parameter corresponding to the lens position or optical axis inclination of said photographic lens section.

6. The photographic apparatus according to claim 2, wherein said photographic lens section includes a lens having changeable inclination of an optical axis thereof or changeable position thereof;

said photographic parameter detecting section detects the position of the lens or the inclination of the optical axis as said photographic parameter; and said image correction section performs distortion correction of said image signal based on the predetermined calibration parameter corresponding to the lens position or optical axis inclination of said photographic lens section.

7. The photographic apparatus according to claim 3, wherein said photographic lens section includes a lens having changeable inclination of an optical axis thereof or changeable position thereof;

said photographic parameter detecting section detects the position of the lens or the inclination of the optical axis as said photographic parameter; and said image correction section performs distortion correction of said image signal based on the predetermined calibration parameter corresponding to the lens position or optical axis inclination of said photographic lens section.

8. The photographic apparatus according to claim 1, wherein said photographic lens section includes a plurality of photographic lens sections having overlapping photographic areas;

the photographic parameter detecting section detects, as said photographic parameter, the installation positions and optical axis directions of said plural number of said photographic lens sections; and said image correction section performs distortion correction of said image signal based on the predetermined calibration parameters corresponding to the lens installation positions and optical axis directions of said plural number of photographic lens sections.

9. The photographic apparatus according to claim 2, wherein said photographic lens section includes a plurality of photographic lens sections having overlapping photographic areas;

the photographic parameter detecting section detects, as said photographic parameter, the installation positions and optical axis directions of said plural number of said photographic lens sections; and said image correction section performs distortion correction of said image signal based on the predetermined calibration parameters corresponding to the lens installation positions and optical axis directions of said plural number of photographic lens sections.

10. The photographic apparatus according to claim 3, wherein said photographic lens section includes a plurality of photographic lens sections having overlapping photographic areas;

the photographic parameter detecting section detects, as said photographic parameter, the installation positions and optical axis directions of said plural number of said photographic lens sections; and said image correction section performs distortion correction of said image signal based on the predetermined calibration parameters corresponding to the lens installation positions and optical axis directions of said plural number of photographic lens sections.

11. The photographic apparatus according to claim 1, wherein said image correction section includes a panoramic image forming section for correlating the data of a plurality of images having overlapped areas photographed by said photographic lens section to form a panoramic image.

12. The photographic apparatus according to claim 2, wherein said image correction section includes a panoramic image forming section for correlating the data of a plurality of images having overlapped areas photographed by said photographic lens section to form a panoramic image.

13. The photographic apparatus according to claim 3, wherein said image correction section includes a panoramic image forming section for correlating the data of a plurality of images having overlapped areas photographed by said photographic lens section to form a panoramic image.

14. The photographic apparatus according to claim 5, wherein said image correction section includes a panoramic image forming section for correlating the data of a plurality of images having overlapped areas photographed by said photographic lens section to form a panoramic image.

15. The photographic apparatus according to claim 8, wherein said image correction section includes a panoramic image forming section for correlating the data of a plurality of images having overlapped areas photographed by said photographic lens section to form a panoramic image.

16. The photographic apparatus according to claim 1, wherein said photoreceptor section forms a digital image signal;

further comprising a digital image storing section for storing the digital image signal sent from said photoreceptor section as well as storing the photographic parameters, wherein said digital image storing section stores said digital image signal as a predetermined format.

17. The photographic apparatus according to claim 2, wherein said photoreceptor section forms a digital image signal;

further comprising a digital image storing section for storing the digital image signal sent from said photoreceptor section as well as storing the photographic parameters, wherein said digital image storing section stores said digital image signal as a predetermined format.

18. The photographic apparatus according to claim 3, wherein said photoreceptor section forms a digital image signal;

further comprising a digital image storing section for storing the digital image signal sent from said photoreceptor section as well as storing the photographic parameters, wherein said digital image storing section stores said digital image signal as a predetermined format.

19. The photographic apparatus according to claim 5, wherein said photoreceptor section forms a digital image signal;

further comprising a digital image storing section for storing the digital image signal sent from said photoreceptor section as well as storing the photographic parameters, wherein said digital image storing section stores said digital image signal as a predetermined format.

20. The photographic apparatus according to claim 8, wherein said photoreceptor section forms a digital image signal;

further comprising a digital image storing section for storing the digital image signal sent from said photoreceptor section as well as storing the photographic parameters, wherein said digital image storing section stores said digital image signal as a predetermined format.

21. A photographic method comprising the steps of:

detecting a photographic parameter of a photographic lens section during photographing with said photographic lens section with an adjustable photographic parameter, wherein the photographic parameter is a focal length;

receiving, at a photoreceptor section, image information formed by said photographic lens section;

receiving an image signal from said photoreceptor section;

performing distortion correction of said image signal based on predetermined calibration parameters corresponding to the detected photographic parameter, wherein the predetermined calibration parameters include a lens distortion parameter and a principal position parameter. wherein the lens distortion parameter is $k_1$ and $k_2$, the principal position parameter is $x_0$ and $y_0$, and the calibration to x, a coordinate in x-axis, and y, a coordinate in y-axis in an image coordinate system, is done using following equations where c is a constant:

$$\Delta x = x_0 + x(k_1 r^2 + k_2 r^4)$$

$$\Delta y = y_0 + y(k_1 r^2 + k_2 r^4)$$

$$r^2 = (x^2 + y^2)/c^2.$$

\* \* \* \* \*